(12) United States Patent
Ling et al.

(10) Patent No.: US 9,326,090 B2
(45) Date of Patent: Apr. 26, 2016

(54) METHOD AND SYSTEM FOR BROADBAND NEAR-FIELD COMMUNICATION UTILIZING FULL SPECTRUM CAPTURE (FSC) SUPPORTING SCREEN AND APPLICATION SHARING

(71) Applicant: MAXLINEAR, INC., Carlsbad, CA (US)

(72) Inventors: Curtis Ling, Carlsbad, CA (US); Timothy Gallagher, Encinitas, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 294 days.

(21) Appl. No.: 13/769,031

(22) Filed: Feb. 15, 2013

(65) Prior Publication Data
US 2013/0210353 A1     Aug. 15, 2013

Related U.S. Application Data

(60) Provisional application No. 61/599,045, filed on Feb. 15, 2012, provisional application No. 61/605,001, filed on Feb. 29, 2012.

(51) Int. Cl.
| | |
|---|---|
| *H04B 5/00* | (2006.01) |
| *H04W 4/00* | (2009.01) |
| *H04B 17/309* | (2015.01) |

(52) U.S. Cl.
CPC ............... *H04W 4/008* (2013.01); *H04B 5/00* (2013.01); *H04B 5/0037* (2013.01); *H04B 17/309* (2015.01)

(58) Field of Classification Search
CPC ....... H04W 4/008; H04B 5/0037; H04B 5/00; H04B 17/309

USPC ......... 370/320, 335, 342, 441, 479; 455/41.1, 455/41.2, 63.1, 509, 109, 450
See application file for complete search history.

(56) References Cited

U.S. PATENT DOCUMENTS

| | | | | |
|---|---|---|---|---|
| 5,533,023 | A * | 7/1996 | Ohlson et al. | 370/319 |
| 5,566,164 | A * | 10/1996 | Ohlson | 370/320 |
| 6,901,112 | B2 * | 5/2005 | McCorkle | H04B 1/71632 370/213 |
| 7,058,414 | B1 * | 6/2006 | Rofheart | G01S 7/023 455/411 |
| 7,167,528 | B2 * | 1/2007 | Chen et al. | 375/302 |

(Continued)

OTHER PUBLICATIONS

Int'l Search Report and Written Opinion for PCT/US2013/026367, dated Apr. 30, 2013.

(Continued)

*Primary Examiner* — Marceau Milord
(74) *Attorney, Agent, or Firm* — McAndrews, Held & Malloy, Ltd.

(57) ABSTRACT

A wireless communication device (WCD) establishes an ad-hoc communication link with a second WCD within operating range. A replica of at least a portion of a display of the first WCD may be shared with the second WCD utilizing wireless broadband signals that are communicated via the established one or more ad-hoc communication links. The first WCD and the second WCD are operable to communicate the wireless broadband signals at a power level that is below a spurious emissions mask. The transmitted wireless broadband signals are spread so they occupy a designated frequency spectrum band. The shared replica of at least a portion of the display of the first WCD includes one or more applications, text, video and/or data content. A user of the first WCD may interact with content that is displayed on a display of the second WCD and vice-versa.

20 Claims, 17 Drawing Sheets

(56) References Cited

U.S. PATENT DOCUMENTS

| | | | | |
|---|---|---|---|---|
| 7,706,748 B2* | 4/2010 | Dutta | H04B 7/2041 370/316 | |
| 8,019,290 B2* | 9/2011 | Mak | H03D 3/007 375/295 | |
| 8,274,885 B2* | 9/2012 | Wu | H04L 27/2647 370/210 | |
| 8,379,736 B2* | 2/2013 | Santhoff | G01S 13/765 375/259 | |
| 8,654,262 B2* | 2/2014 | Du Val | H04B 1/034 348/725 | |
| 8,725,113 B2 | 5/2014 | Gargi et al. | | |
| 8,837,724 B2* | 9/2014 | Rose | H04L 63/08 380/247 | |
| 8,879,983 B2* | 11/2014 | Yun | H04W 72/085 455/307 | |
| 2001/0034475 A1* | 10/2001 | Flach et al. | 600/300 | |
| 2002/0042290 A1 | 4/2002 | Williams | | |
| 2003/0220765 A1 | 11/2003 | Overy et al. | | |
| 2006/0079214 A1* | 4/2006 | Mertama et al. | 455/414.1 | |
| 2006/0083187 A1 | 4/2006 | Dekel | | |
| 2007/0019959 A1* | 1/2007 | Retnasothie et al. | 398/115 | |
| 2007/0076666 A1* | 4/2007 | Riveiro et al. | 370/335 | |
| 2007/0258542 A1* | 11/2007 | Cleveland | H04L 25/03834 375/296 | |
| 2008/0004904 A1 | 1/2008 | Tran | | |
| 2009/0196180 A1 | 8/2009 | Bahl et al. | | |
| 2009/0247136 A1* | 10/2009 | Srinivasan et al. | 455/414.2 | |
| 2010/0056114 A1* | 3/2010 | Roundtree et al. | 455/414.1 | |
| 2010/0110185 A1* | 5/2010 | Tafazoli Bilandi et al. | 348/143 | |
| 2010/0220250 A1* | 9/2010 | Vanderwall et al. | 348/837 | |
| 2010/0232413 A1* | 9/2010 | Dakshinamurthy et al. | 370/343 | |
| 2010/0317332 A1* | 12/2010 | Bathiche et al. | 455/418 | |
| 2011/0313922 A1 | 12/2011 | Ben Ayed | | |
| 2011/0319119 A1 | 12/2011 | Ishii | | |
| 2012/0182887 A1 | 7/2012 | Junell et al. | | |
| 2012/0329384 A1* | 12/2012 | Boldyrev | H04W 40/248 455/39 | |
| 2013/0038278 A1 | 2/2013 | Park et al. | | |
| 2013/0210345 A1 | 8/2013 | Ling et al. | | |
| 2013/0210346 A1 | 8/2013 | Ling et al. | | |
| 2013/0210347 A1 | 8/2013 | Ling et al. | | |
| 2013/0210352 A1 | 8/2013 | Ling et al. | | |

OTHER PUBLICATIONS

Lai "Low-profile broadband RFID tag antennas mountable on metallic objects", Antennas and Propagation Society International Symposium (APSURSI), 2010 IEEE, pp. 1-4, Jul. 11-17, 2010.

* cited by examiner

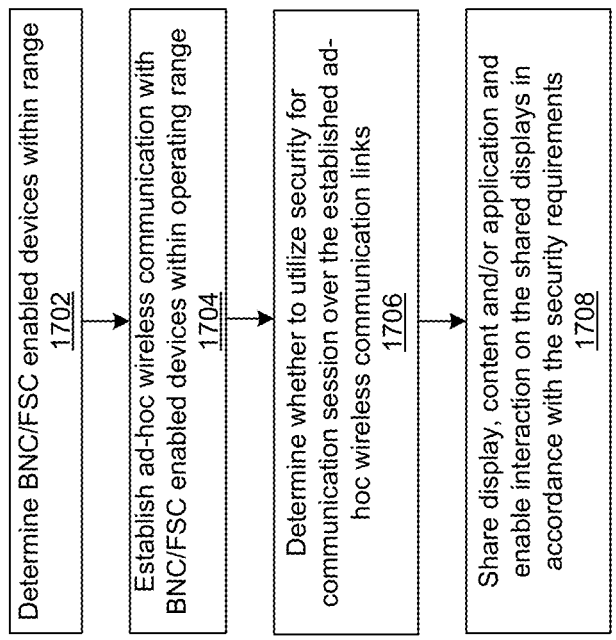

METHOD AND SYSTEM FOR BROADBAND NEAR-FIELD COMMUNICATION UTILIZING FULL SPECTRUM CAPTURE (FSC) SUPPORTING SCREEN AND APPLICATION SHARING

CROSS-REFERENCE TO RELATED APPLICATIONS/INCORPORATION BY REFERENCE

This patent application makes reference to, claims priority to, and claims benefit from:
U.S. Provisional Application Ser. No. 61/599,045, which was filed on Feb. 15, 2012; and
U.S. Provisional Application Ser. No. 61/605,001, which was filed on Feb. 29, 2012.
This application also makes reference to:
U.S. Application Publication Serial No. 2013/0210345, which is filed on Dec. 21, 2012;
U.S. Application Publication Serial No. 2013/0210350, which is filed on Feb. 15, 2013;
U.S. Application Publication Serial No. 2013/0210351, which is filed on Feb. 15, 2013;
U.S. Application Publication Serial No. 2013/0210346, which is filed on Dec. 26, 2012;
U.S. Application Publication Serial No. 2013/0210347, which is filed on Dec. 26, 2012; and
U.S. Application Publication Serial No. 2013/0210352, which is filed on Feb. 15, 2013.

FIELD OF THE INVENTION

Certain embodiments of the invention relate to communication systems. More specifically, certain embodiments of the invention relate to a method and system for broadband near-field communication utilizing full spectrum capture supporting screen and application sharing.

BACKGROUND OF THE INVENTION

Near Field Communication (NFC) is a new short-range, standards-based wireless connectivity technology that uses magnetic field induction to enable communication between electronic devices in close proximity. Based on radio frequency identification (RFID) technologies, NFC provides a medium for the identification protocols that validate secure data transfer. NFC enables users to perform intuitive, safe, contactless transactions, access digital content and connect electronic devices simply by touching or bringing devices into close proximity.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for broadband near-field communication utilizing full spectrum capture supporting screen and application sharing, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 17 is a flow chart illustrating exemplary steps for providing screen and application utilizing Broadband Near Field Communication (BNC) with full spectrum capture (FSC), in accordance with an embodiment of the invention.

DETAILED DESCRIPTION OF THE INVENTION

Figure 1:
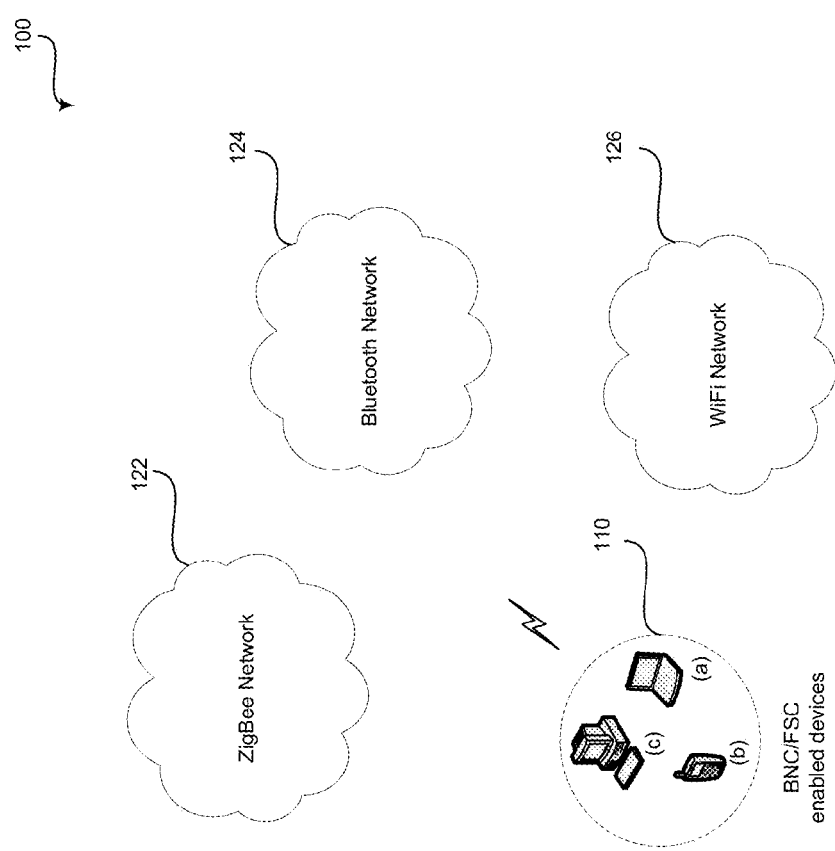
FIG. 1 is a diagram that illustrates an exemplary communication system, such as a Broadband Near Field Communication (BNC) system, that utilizes full spectrum capture (FSC), in accordance with an exemplary embodiment of the invention.

Certain embodiments of the invention may be found in a method and system for broadband near-field communication utilizing full spectrum capture (BNC/FSC) supporting screen and application sharing. In various embodiments of the invention, a first wireless communication device is operable to establish a wireless communication link with a second wireless communication device within operating range. A replica of at least a portion of a display of the first wireless communication device may be shared with the second wireless communication device utilizing wireless broadband signals that are communicated via the established ad-hoc communication link. The first wireless communication device and the second wireless communication device are operable to communicate the wireless broadband signals at a power level that is below a spurious emissions mask. The transmitted wireless broadband signals may occupy a designated frequency spectrum band. The wireless broadband signals may be spread across the entire designated frequency spectrum band such that a bandwidth of the wireless broadband signals occupy approximately 800 MHz within a range of 0 Hz to 1 GHz. A corresponding transmit power utilized for transmitting the wireless broadband signals may be spread over a bandwidth of approximately 300 MHz within the 800 MHz bandwidth such that the spreading results in a power spectral density of the transmitted wireless broadband signals approximating thermal noise at a distance of approximately 3 meters.

The shared replica of at least a portion of the display of the first wireless communication device may comprise applications, text, files, video and/or data content. A user of the first wireless communication device may interact with content that is displayed on a display of the second wireless communication device and vice-versa. It may be determined whether to utilize security for the sharing and/or the interaction based on proximity of the first wireless communication device to the second wireless communication device and/or based on corresponding profiles of the first wireless communication device or the second wireless communication device.

The second wireless communication device may be operable to establish a new ad-hoc communication link with a third wireless communication device. The third wireless communication device is operable to communicate with the second wireless communication device utilizing the wireless broadband signals which may be communicated via the established new ad-hoc communication link. The second wireless communication device may be operable to share a replica of at least a portion of a display of the second wireless communication device with the third wireless communication device via the established new ad-hoc communication link. The sharing of the replica of at least a portion of the display of the first wireless communication device and the sharing of the display of the second wireless communication device may occur concurrently. The established one or more ad-hoc communication links may comprise bi-directional communication links.

FIG. 1 is a diagram that illustrates an exemplary communication system, such as a Broadband Near Field Communication (BNC) system for example, that utilizes full spectrum capture (FSC), in accordance with an exemplary embodiment of the invention. Referring to FIG. 1, there is shown a communication system 100 comprising a plurality of devices 110(a) through 110(c), and associated communication networks 122 through 126. The plurality of devices 110(a) through 110(c) may be, for example, BNC/FSC enabled.

A BNC/FSC enabled device such as the BNC/FSC enabled device 110(a) may comprise suitable logic, circuitry, code, and/or interfaces that may be operable to perform Broadband Near Field Communication (BNC) with other BNC/FSC enabled devices. In this regard, the BNC/FSC enabled device 110(a) may exchange or communicate various types of information such as, for example, telephone numbers, pictures, multimedia content and files such as MP3 files, and/or digital authorizations with other BNC/FSC enabled devices such as the BNC/FSC enabled devices 110(b) and 110(c). For data transmission with BNC, a BNC enabled device that initiates the data transmission refers to a polling device (initiator), while a BNC enabled device that is targeted by the polling device refers to a listening device. A BNC enabled device such as the BNC/FSC enabled device 110(a) may operate in a reader/writer mode (active mode), a card emulation mode (passive mode), or a peer-to-peer mode. In active mode, the BNC/FSC enabled device 110(a) is active and reads or writes to a passive legacy RFID tag. In passive mode, the BNC/FSC enabled device 110(a) behaves like an existing contactless card conforming to one of the legacy standards. In peer-to-peer mode, the BNC/FSC enabled device 110(a) and its peer BNC enabled device such as the BNC/FSC enabled device 110(b) may exchange or communicate information. In this regard, the initiator device (polling device) may require less power compared to the reader/writer mode. Depending on device capacities, the BNC/FSC enabled devices 110(a)-110(c) may coexist with or support other wireless technologies such as, for example, ZigBee, Bluetooth, WLAN, and WiMax. In this regard, the BNC/FSC enabled devices 110(b) and 110(c) may operate in various spectrum bands. For example, with Zigbee enabled, the BNC/FSC enabled devices 110(a)-110(c) may operate in 868 MHz, 915 MHz or 2.4 GHz frequency bands. With Bluetooth enabled, the BNC/FSC enabled devices 110(b) and 110(c) may operate within the 2.4 GHz band. With WLAN enabled, the BNC/FSC enabled devices 110(b) and 110(c) may operate within the 2.4, 3.6 and 5 GHz frequency bands. With fixed WiMAX enabled, the BNC/FSC enabled devices 110(b) and 110(c) may operate in the 2.5 GHz and 3.5 GHz frequency bands, which require a license, as well as the license-free 5.8 GHz band. With mobile WiMAX enabled, the BNC/FSC enabled devices 110(b) and 110(c) may operate in the 2.3-2.4 GHz, 2.5-2.7 GHz, 3.3-3.4 GHz and 3.4-3.8 GHz frequency bands.

In an exemplary embodiment of the invention, the BNC/FSC enabled device 110(a) may be operable to utilize full-spectrum capture (FSC) technology to meet the challenging demands of operators, consumers, and hardware vendors while providing efficient scalability for future development.

In this regard, the BNC/FSC enabled device 110(a) may be operable to digitize all, or substantially all, of the spectrum covered by the protocol(s) of interest, such that all, or substantially all, channels of the protocol(s) are concurrently digitized and available for further processing. The BNC/FSC enabled device 110(a) may utilize BNC together with full spectrum capture to provide BNC/FSC hybrid solutions for proliferating data or content delivery and services throughout the home and to connected devices such as the BNC/FSC enabled devices 110(b) and 110(c). Aspects of full spectrum capture may be found in U.S. application Ser. No. 13/485,003 filed May 31, 2012, U.S. application Ser. No. 13/336,451 filed on Dec. 23, 2011 and U.S. Application 61/532,098 filed Sep. 7, 2011. Each of these applications is hereby incorporated herein by reference in its entirety.

The ZigBee network 122 may comprise suitable logic, circuitry, code, and/or interfaces that may be operable to provide data services to various ZigBee-based devices such as the BNC/FSC enabled devices 110(a)-110(c) using Zig-Bee technology. ZigBee is a standard that defines a set of communication protocols on top of the IEEE 802.15.4 Radio Protocol for low-data-rate short-range wireless networking. For example, the ZigBee network 122 may incorporate ZigBee radios to operate at 1 mW RF power and to go to sleep when not involved in transmission so as to minimize power consumption and promote long battery life in battery-powered devices.

The Bluetooth network 124 may comprise suitable logic, circuitry, interfaces and/or code that may be operable to provide data services to various Bluetooth-based mobile devices such as the BNC/FSC enabled devices 110a-110c using Bluetooth technology. A Bluetooth-based mobile device such as the BNC/FSC enabled device 110a may be operable to communicate Bluetooth radio frequency signals with peer Bluetooth devices such as the BNC/FSC enabled devices 110(b)-110(c) for various data services such as SMS/MMS and mobile TV.

The WiFi network 126 may comprise suitable logic, devices, interfaces and/or code that may be operable to provide data services to various mobile devices such as the BNC/FSC enabled devices 110(a)-110(c) by using WiFi technology. A WiFi-based mobile device such as the BNC/FSC enabled device 110a may be operable to communicate WiFi radio frequency signals with peer WiFi devices such as the BNC/FSC enabled devices 110(b)-110(c) for various data services such as SMS/MMS and mobile TV.

In operation, the BNC/FSC devices 110(a)-110(c) may provide BNC/FSC hybrid solutions for signal or data transmission at power densities through associated communication networks such as the Bluetooth network 124. To support the data transmission with BNC, the BNC/FSC enabled devices 110(a)-110(c) may be configured to utilize full spectrum capture in order to detect usable channels and aggregate the usable channels to increase channel bandwidth for the data transmission. In one embodiment of the invention, for transmission, the data transmission may be carried or transmitted over a single channel within the operating spectrum band. However, for reception, multiple reference elements or signals such as pilot signals may be utilized to determine or detect which of channels in the operating spectrum band may be indeed usable.

Figure 2:
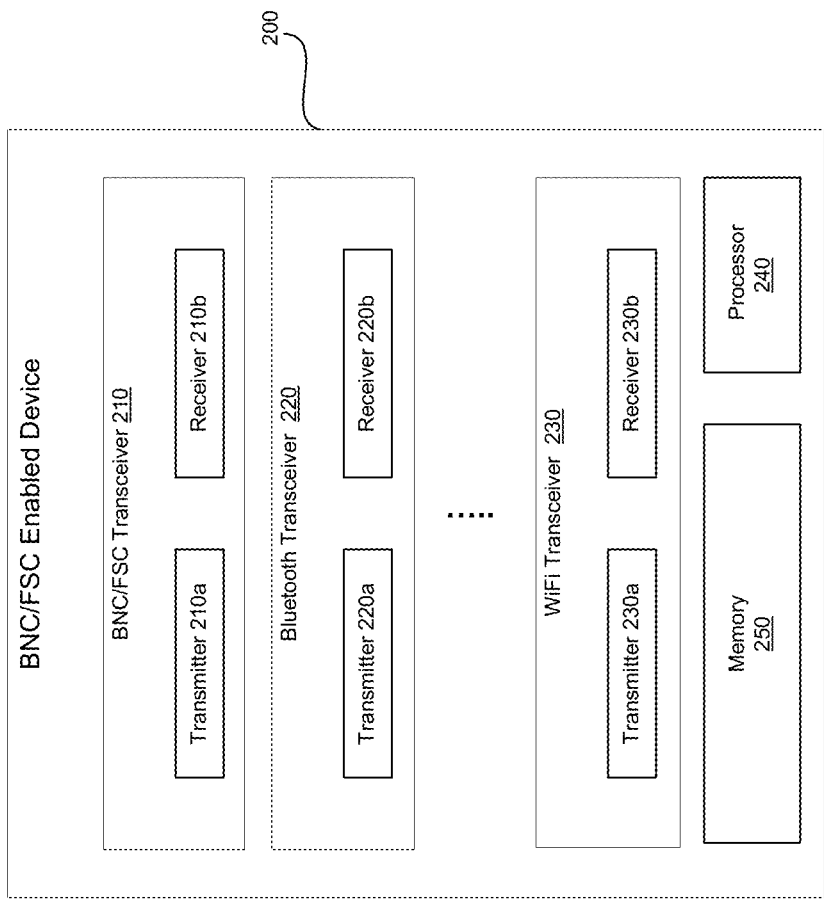
FIG. 2 is a block diagram that illustrates an exemplary device that performs, for example, Broadband Near Field Communication (BNC) utilizing full spectrum capture (FSC), in accordance with an exemplary embodiment of the invention.

FIG. 2 is a block diagram that illustrates an exemplary device that performs, for example, Broadband Near Field Communication (BNC) utilizing full spectrum capture (FSC), in accordance with an exemplary embodiment of the invention. Referring to FIG. 2, there is shown a device 200 comprising a transceiver 210, a Bluetooth transceiver 220, a WiFi transceiver 230, a processor 240, and a memory 250. The BNC/FSC transceiver 210 may comprise a transmitter 210a and a receiver 210b. The Bluetooth transceiver 220 may comprise a transmitter 220a and a receiver 220b. The WiFi transceiver 230 may comprise a transmitter 230a and a receiver 230b. The transceiver 210 may be, for example, a BNC/FSC transceiver 210. The Bluetooth transceiver 220 and the WiFi transceiver 230 may be optional depending on device capabilities, network availabilities and/or user preferences.

The BNC/FSC transceiver 210 may comprise suitable logic, circuitry, interfaces and/or code that may allow the BNC/FSC enabled device 200 and other BNC capable devices to perform communication according to a BNC protocol. The BNC/FSC transceiver 210 may operate in a reader/writer mode (active mode), a card emulation mode (passive mode), or a peer-to-peer mode. In active mode, the BNC/FSC transceiver 210 may act like contactless cards. In this regard, the BNC/FSC transceiver 210 may enable the BNC/FSC enabled device 200 being used for payment. In passive mode, the BNC/FSC transceiver 210 may enable interacting with RF tags. For example, the BNC/FSC transceiver 210 may enable the BNC/FSC enabled device 200 used to read 'Smart Posters' (writer RF tags) to see whatever information has been included. In peer-to-peer mode, the BNC/FSC transceiver 210 may be operable to communicate with another BNC capable devices. For example, the BNC/FSC transceiver 210 may enable the BNC/FSC enabled device 200 to communicate information with other BNC/FSC enabled devices 110 (a)-110(c).

In an exemplary embodiment of the invention, the BNC/FSC transceiver 210 may utilize a dedicated RF front-end circuitry for data transmission and receiving using BNC. In this regard, the transmitter 210a may be operable to utilize a dedicated transmit RF front-end circuitry for data transmission and the receiver 210b may be operable to utilize a dedicated receive RF front-end circuitry for data reception. Accordingly, there are no shared components between the transmitter 210a and other transmitters (e.g. 220a, 230a) and there are no shared components between the receiver 210b and other receivers (e.g. 220b, 230b) In another exemplary embodiment of the invention, the BNC/FSC transceiver 210 may share a RF front-end circuitry with other technology-based transceivers such as the Bluetooth transceiver 220 and the WiFi transceiver 230. In this regard, the transmitter 210a may be operable to share transmit RF front-end circuitry with the transmitter 220a of the Bluetooth transceiver 220 and/or the transmitter 230a of the WiFi transceiver 230. The receiver 210b may be operable to share receive RF front-end circuitry with the receiver 220b of the Bluetooth transceiver 220 and/or the receiver 230b of the WiFi transceiver 230. In yet another exemplary embodiment of the invention, the BNC/FSC transceiver 210 may be configured to communicate signals or data in BNC utilizing full spectrum capture. In this regard, the BNC/FSC transceiver 210 may be allowed to capture or utilize the entire spectrum band for data or signal transmission and receiving. For transmission, the BNC/FSC transceiver 210 may be instructed or signaled to utilize a single channel within the spectrum band. For reception, the BNC/FSC transceiver 210 may be configured to utilize one or more channels within the entire spectrum band.

The Bluetooth transceiver 220 may comprise suitable logic, circuitry, interfaces and/or code that may be operable to communicate Bluetooth radio signals over the Bluetooth network 124. In an exemplary embodiment of the invention, the Bluetooth transceiver 220 may be on continuously when needed and may utilize more power than full spectrum capture. The Bluetooth transceiver 220 may be enabled to support coexistence operations so as to receive Bluetooth signals while utilizing full spectrum capture in the BNC/FSC enabled device 200. In an exemplary embodiment of the invention, the Bluetooth transceiver 220 may utilize a dedicated RF front-end circuitry for data transmission and receiving using Bluetooth. In another exemplary embodiment of the invention, the Bluetooth transceiver 220 may share a RF front-end circuitry with the BNC/FSC transceiver 210 for data transmission and receiving using Bluetooth. In an exemplary embodiment of the invention, in some instances, the Bluetooth transceiver 220 may be securely paired with other Bluetooth and BNC capable devices utilizing BNC. In this regard, the BNC/FSC transceiver 210 may be enabled to exchange authentication information over an BNC link for pairing the Bluetooth transceiver 220 with other Bluetooth and BNC capable devices.

The WiFi transceiver 230 may comprise suitable logic, circuitry, interfaces and/or code that may be operable to communicate WiFi radio signals over the WiFi network 126. In an exemplary embodiment of the invention, the WiFi transceiver 230 may be on continuously when needed and may utilize more power than full spectrum capture. The WiFi transceiver 230 may be enabled to support coexistence operations so as to receive WiFi signals while utilizing full spectrum capture in the BNC/FSC enabled device 200. In an exemplary embodiment of the invention, the WiFi transceiver 230 may utilize a dedicated RF front-end circuitry for data transmission and reception using WiFi. In another exemplary embodiment of the invention, the WiFi transceiver 230 may share a RF front-end circuitry with the BNC/FSC transceiver 210 for data transmission and receiving using WiFi.

The processor 240 may comprise suitable logic, circuitry, interfaces and/or code that may be enabled to perform a variety of signal processing tasks such as channel selection or filtering, digital scaling, rate conversion, carrier/time synchronization/recovery, equalization/demapping, and/or channel decoding. The processor 240 may support various modem operations such as OFDM and CDMA operations. The processor 240 may be operable to coordinate and control operations of the BNC/FSC transceiver 210, the Bluetooth transceiver 220, and the WiFi transceiver 230 to communicate corresponding radio signals while utilizing full spectrum capture. For example, the processor 240 may manage, activate or deactivate the BNC/FSC transceiver 210 according to received Bluetooth signals via the Bluetooth transceiver 220. The processor 240 may also be operable to synchronize the operation of the BNC/FSC transceiver 210 and the Bluetooth transceiver 220, for example, so as to reduce time delay for accurately determining the location of an object of interest. In an exemplary embodiment of the invention, the processor 240 may be operable to manage data transmission as well as data reception. For transmission, the processor 240 may be operable to select or utilize a single channel within the operation spectrum band for data transmission. For reception, the processor 240 may be operable to utilize multiple reference elements or signals such as pilot signals to determine or detect which of channels in the operation spectrum band may be indeed usable. The processor 240 may also be operable to aggregate the usable channels to increase channel bandwidth for the data transmission.

In various embodiments of the invention, the processor 240 may enable configuration of the BNC/FSC enabled device 200 to operate in different communication environments. In this regard, for example, power, distance and bandwidth may be configured in order to stay within the FCC masks and limits and at the same time, provide optimal performance across the entire bandwidth.

For FCC requirements, power may be measured in a 120 KHz spectrum bandwidth. To determine how much power could be transmitted, the bandwidth available has to be determined. Once the bandwidth is determined, that value may be divided by 120 KHz and the results multiplied by the power that may be transmitted. For example, within the broadcast television frequency band, spurious radiation within a 120 kHz bandwidth must result in a field strength of 200 microvolts per meter or less, measured at a distance of 3 meters from an isotropic radiator. This field strength equates to a transmitted power of 0.01 microwatts (−50 dBm) of power radiating isotropically. If a bandwidth much larger than 120 kHz is utilized, the FCC requirements imply that much more power may be transmitted without transgressing limits on spurious emissions. For example, if a device transmits its power over a 100 MHz bandwidth, then dividing this 100 MHz bandwidth by the measurement bandwidth of 120 KHz results in a 29 dB increase in allowable spurious emission levels. In order to stay well within the FCC limitations for spurious emissions, a device may be designed to transmit −50 dBm spread over a full gigahertz (GHz) of bandwidth, which is 39 dB below the FCC spurious radiation power spectral density limitations. With such a conservative estimate, the FCC may not possibly complain and consumer product manufacturers may have no issues or have any questions about whether the product may pass the FCC regulation.

Although −50 dBm may seem like very little power, using full spectrum capture may enable a wealth of applications. At this power level, several bits per second per hertz may be reliably conveyed across a distance of about 10 cm, equating to several gigabits per second of capacity if the entire television spectrum up to 1 GHz is employed. If the −50 dBm transmitted power is spread over a subset of the television spectrum (e.g. 200 to 600 MHz), there is a low likelihood of interference with any device 3 meters or farther away.

When broadband near-field communication is employed at a distance less than a wavelength, then attenuation improves nonlinearly as distance decreases linearly.

The processor 240 may establish a high data rate communication link utilizing BNC which transmits power levels 30 dB or more below spurious emission levels permitted by FCC, while maintaining a link budget with sufficient margin to address a variety of use cases, trading off data rate for transmission distance or barrier penetrating capabilities. One method of implementing this tradeoff is to use spread spectrum techniques to achieve spreading gain in exchange for throughput, such as is employed in CDMA systems. With a 30 dB margin, signals may, for example, be communicated through a typical non-load-bearing concrete wall.

The transmitter 210a in the BNC/FSC transceiver 210 is operable to transmit generated wireless broadband signals at a power level that is below a spurious emissions mask. The transmitter 210a may transmit the wireless broadband signals so that the transmitted wireless broadband signals occupy a designated frequency spectrum band. In an exemplary embodiment of the invention, the transmitter 210a may transmit the wireless broadband signals so that a bandwidth of the transmitted wireless broadband signals may occupy approximately 800 MHz within a frequency range of 0 Hz to 1 GHz.

The transmitter 210a may also be operable to transmit the wireless broadband signals so that the corresponding power utilized for transmitting the wireless broadband signals may be spread over a bandwidth of approximately 300 MHz within the 800 MHz bandwidth. In an aspect of the invention, the spreading the wireless broadband signals may result in a power spectral density of the transmitted wireless broadband signals approximating thermal noise at a distance of approximately 3 meters.

The transmitter 201a in the BNC/FSC transceiver 210 may be operable to sense the designated frequency spectrum band for available channels in order to transmit the wireless broadband signals. In this regard, the transmitter 210a may be operable aggregate a plurality of the sensed available channels in order to transmit the wireless broadband signals. The transmitter 210a in the BNC/FSC transceiver 210 may be operable to communicate the wireless broadband signals via one or more asymmetric gain antennas. In this regard, the transmitter 210a is in the BNC/FSC transceiver 210 operable to transmit the wireless broadband signals via the one or more asymmetric gain antennas utilizing low gain. Accordingly, in one aspect of the invention, the transmitted wireless broadband signals may be received via one or more asymmetric gain antennas utilizing a high gain.

In an exemplary embodiment of the invention, the processor 240 may enable the use of a channel or spectrum map to dynamically track in real-time, what frequencies in the channel band are usable. For example, the environment may be sensed and a channel map, which may also be referred to as a channel table, may be generated to identify TV, Bluetooth, WiMax, and 802.11 channels and the status of the identified channels noted. The channels that are not currently usable, for example above a certain noise threshold, will be avoided. The channel map is dynamically updated. A channel may be usable and unavailable, for example, when the channel is favorable for communication but the channel is currently in use by a device. Once communication on the channel ceases and the channel is clear, it status in the channel map may be marked as usable and available. A channel may be unusable and unavailable if the channel conditions are not currently conducive to communication of signals and this condition has persisted for some period of time.

In an exemplary embodiment of the invention, a broadband OFDM receiver may be utilized to capture the entire band and selectively begin to transmit on those channels that are deemed suitable (e.g., based on the channel map) for transmission. Since the two devices (Tx and Rx) are relatively close to each other, it may be safe to assume that both devices (Tx and Rx) are experiencing similar RF related conditions. In this regard, the transmitter may transmit without coordination of frequencies between the two devices.

Figure 11:
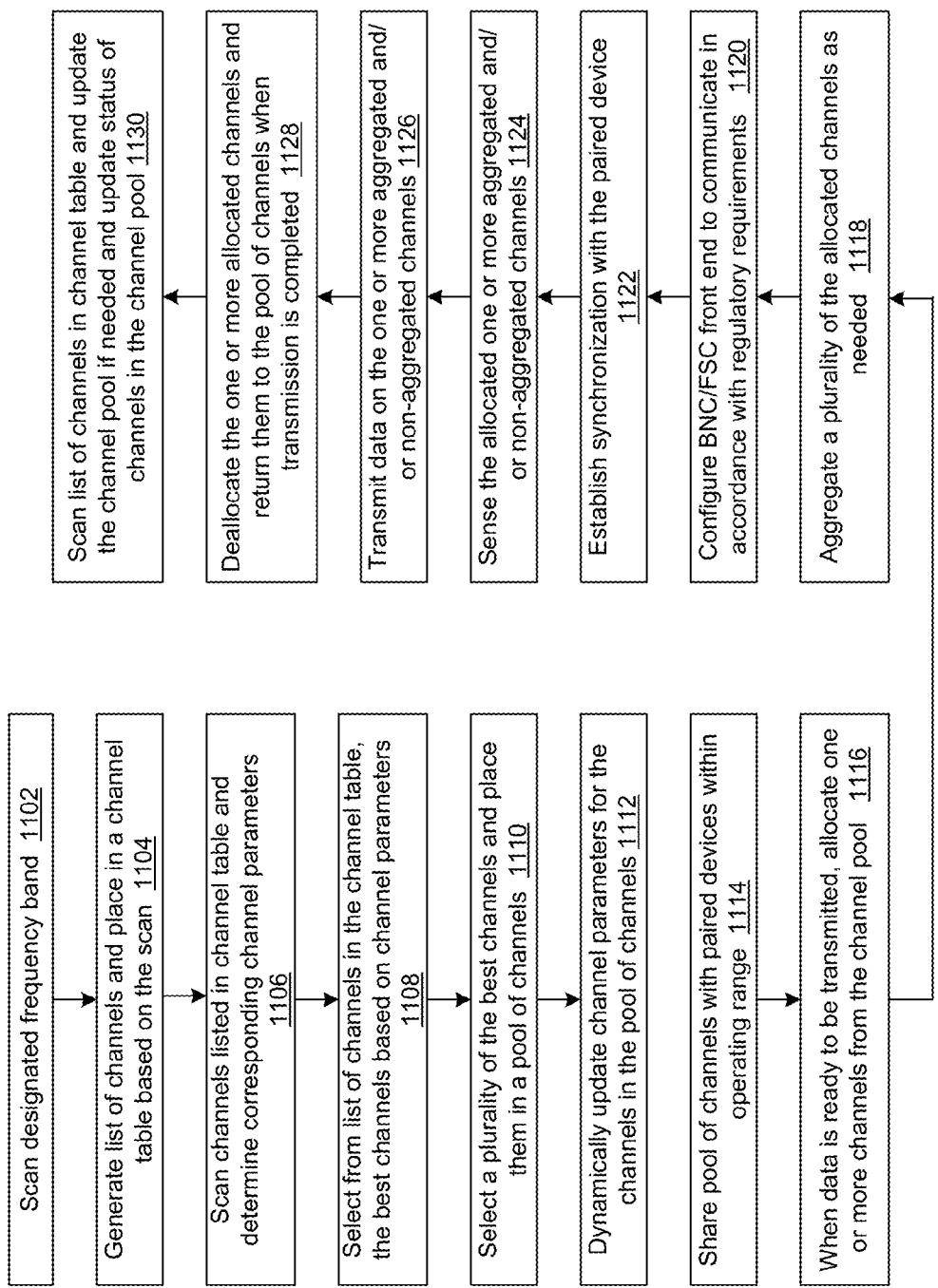
FIG. 11 is a flow chart illustrating exemplary steps for communicating data utilizing Broadband Near Field Communication (BNC) with full spectrum capture (FSC) using a pool of channels, in accordance with an exemplary embodiment of the invention.

In one embodiment of the invention, a pool of backup channels may be maintained and as soon as a current channel degrades, a switch may be made to utilize the backup channels. Channels may be allocated from the pool of backup channels and de-allocated and placed back in the pool as needed. FIG. 11 provides additional details on utilizing a pool of channels.

In an exemplary embodiment of the invention, in instances where the BNC/FSC enabled device 200 may coexist with an 802.11 device, the BNC/FSC enabled device 200 may be operable to sense the channel and transmit only on channels that are determined to be clear. The channel map may be continuously updated to ensure that the status of each of the channels is up-to-date. A weighting may also be applied to the channel.

In one embodiment of the invention, a plurality of users, each with their own spreading code, may concurrently transmit over a large bandwidth without any blocking. A receiver may capture the entire bandwidth and based on security settings, may select and listen to only those authorized user signals that may be of interest. Additional details may be found, for example, in FIG. 12.

In one embodiment of the invention, the processor 240 may enable broadcast feature based distance. For example, the characteristics of a room such as the size and openness may be sensed and the power, data rate, and range for the BNC/FSC enabled device 200 may be adjusted to conform with the sensed characteristics. The BNC/FSC enabled device 200 may be configured to communicate based on some threshold distance that is sensed. In some instances, it may be desirable for all conference participants in a conference room to receive information for a presentation. In this regard, the presenter does not care who receives a broadcast signal of the presentation so long as they are within a certain range, in this case, in the room. For example, all the conference participants may be within a perimeter of 15 feet. The broadcast is therefore controlled so that the content for the presentation is broadcasted to the conference participants within the conference room. In addition, beamforming and MIMO may be employed to determine the characteristics and to optimize communication amongst the devices.

In one embodiment of the invention, the processor 240 may provide or enable security by turning down the transmit power of the BNC/FSC enabled device 200 in order to minimize eavesdropping. In such instances, the containment of the power enables only devices within a certain range to receive signals and devices that are outside that range will not be able to receive signals. A lookup table (LUT), for example, comprising power and distance or range data may be utilized by the processor 240 or other device within the BNC/FSC enabled device 200 to control this security feature.

In another embodiment of the invention, the processor 240 may provide or enable security by ensuring that the processing time is less than the round trip delay in order to prevent spoofing. In this regard, the processor 240 or other device within the BNC/FSC enabled device 200 may be operable to determine the round trip delay. If the determined round trip delay is less than or equal to a certain value or threshold, communication may be permitted. However, in instances where the round trip delay may be greater than a particular value or threshold, communication may be blocked since this may be an indication that spoofing may have occurred.

In an exemplary embodiment of the invention, a conference presenter may walk into a conference room and provide information such as the size of the room and the number of participants. This information may be utilized by the processor 240 to control the power and range that may be utilized to configure the BNC/FSC transceiver for use during the conference or other group presentations. In this manner, device screens and files, for example, may be shared amongst conference or group participant devices.

In another aspect of the invention, a map of conference attendees in the room may be presented and the conference presenter may manually authorize each attendee to receive BNC/FSC presented information.

The memory 250 may comprise suitable logic, circuitry, interfaces and/or code that may enable storage of data and/or other information utilized by the processor 240. For example, the memory 250 may be utilized to store information such as available operation spectrum bands that the BNC/FSC enabled device 200 may operate, and channels in the available operation spectrum bands. The memory 250 may be enabled to store executable instructions to manage or configure the BNC/FSC transceiver 210, the Bluetooth transceiver 220, and/or the WiFi transceiver 230 for desired behavior. The memory 250 may comprise RAM, ROM, low latency non-volatile memory such as flash memory and/or other suitable electronic data storage capable of storing data and instructions.

In operation, the processor 240 may manage and control operation of device components such as the BNC/FSC transceiver 210 (transmitter 210a and receiver 210b) and the Bluetooth transceiver 220 to communicate corresponding radio signals for applications of interest. Transceivers such as the BNC/FSC transceiver 210 may be enabled to utilize full spectrum capture for data communication to support the applications of interest. For example, a transceiver such as the BNC/FSC transceiver 210 may be enabled to digitize the entire operation spectrum band, 1 GHz, for example, for instant access to channels anywhere in the operation spectrum band. In this regard, the use of full spectrum capture may enable the BNC/FSC transceiver 210 with total bandwidth deployment flexibility. For example, transceivers such as the BNC/FSC transceiver 210 may be tuned to an entirely different frequency in the operation spectrum band without constraint. In particular, previously unusable frequencies in the operation spectrum band may now be applied for additional broadband services. Additionally, the BNC/FSC transceiver 210 may be tuned to either broadband or broadcast services, and the channel allocation may be changed over time allowing operators to seamlessly transition services from broadcast to IP.

Figure 3:
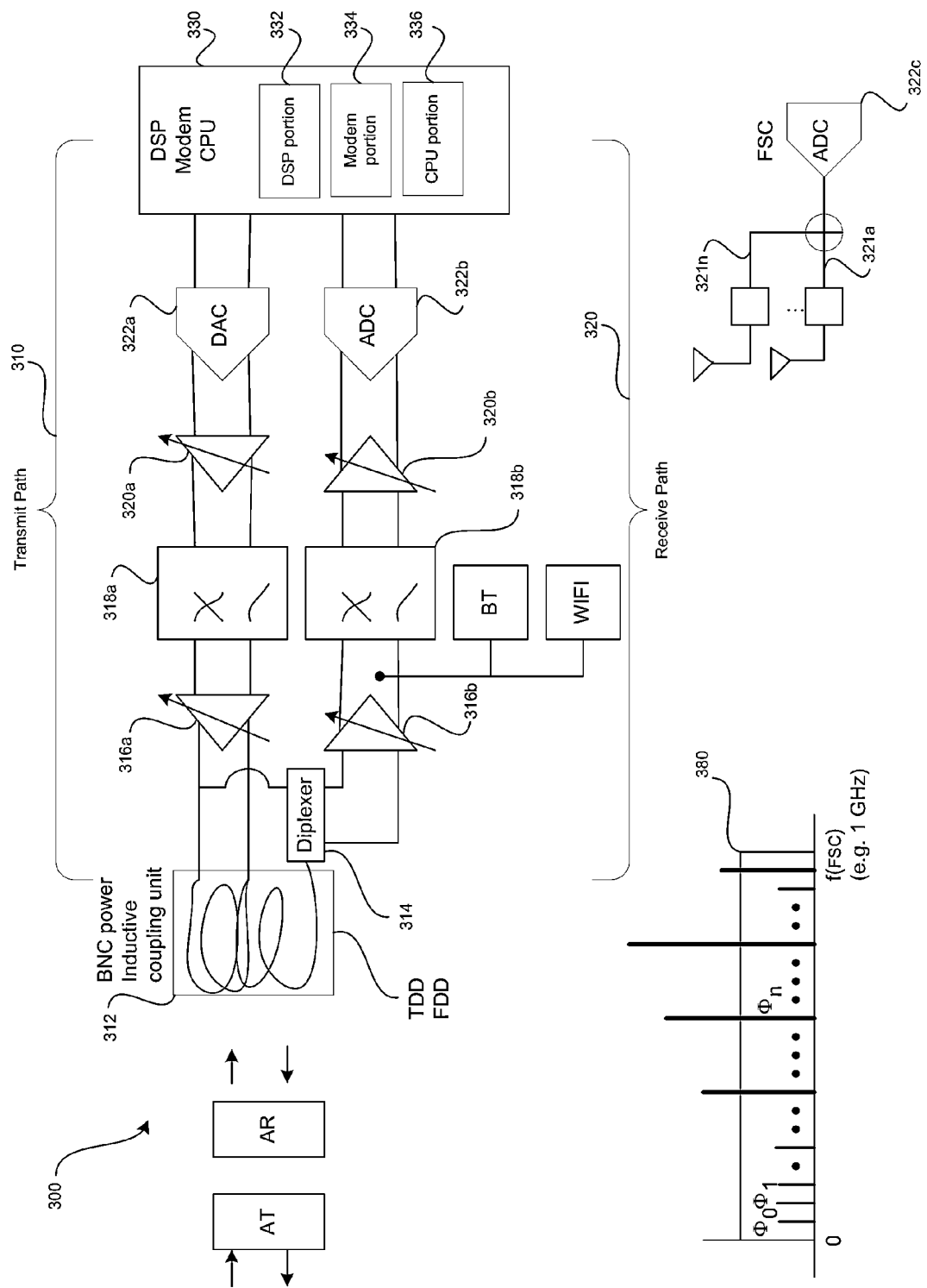
FIG. 3 is a block diagram that illustrates an exemplary controller, such as a Broadband Near Field Communication (BNC) controller for example, utilizing full spectrum capture (FSC), in accordance with an exemplary embodiment of the invention.

FIG. 3 is a block diagram that illustrates an exemplary controller, such as a Broadband Near Field Communication (BNC) controller for example, utilizing full spectrum capture (FSC), in accordance with an exemplary embodiment of the invention. Referring to FIG. 3, there is shown a controller 300, which may be, for example, a BNC/FSC controller. The BNC/FSC controller 300 may comprise a transmit path 310 and a receive path 320, which share a DSP/modem/CPU unit 330. A BNC power inductive coupling unit 312 is coupled to a diplexer 314 such that the BNC power inductive coupling unit 312 may be shared by the transmit path 310 and the receive path 320 for data transmission and data receiving, respectively, over channels, $\phi_1, \ldots, \phi_n$, within a full spectrum band 380. In addition, the transmit path 310 may comprise variable gain amplifiers 316a and 320a, a transmit filter 318a, and a DAC 322a. The receive path 320 may comprise variable gain amplifiers 316b and 320b, a receive filter 318b, and an ADC 322b.

In an exemplary operation, the BNC power inductive coupling unit 312 may comprise suitable logic, circuitry, interfaces and/or code that may be utilized as an antenna for wireless communication operations for signal transmission and reception through the transmit path 310 and the receive path 320, respectively. The BNC power inductive coupling unit 312 may comprise a single broadband near-field inductive coupling device such as a coil or an antenna or an antenna coil, for example. In some instances, the single coil may be utilized for wireless communication operations that are based on time-division duplexing (TDD) and/or frequency-division duplexing (FDD). In addition to being utilized as an antenna for wireless communication operations, the single coil may be utilized for receiving charge from a charging pad, for example, to power or operate at least a portion of the device that comprises the various components shown in FIG. 3. The coil may be communicatively coupled to circuitry (not shown) that may be utilized to manage and/or store the received charge.

In an exemplary embodiment of the invention, the coil of the BNC power inductive coupling unit 312 may comprise a plurality of coil turns. In this regard, the number of coil turns that correspond to the receive path 320 may be larger than the number of coil turns that correspond to the transmit path 310 so as to obtain a low transmit gain and high receive gain operation.

In an exemplary embodiment of the invention, the BNC power inductive coupling unit 312 may also be equalized as part of full spectrum capture, when used as an antenna. Unlike narrowband systems in which the signals are narrowband compared to the characteristics of the antenna, the antenna in full spectrum capture may typically not be optimized for the application. Since the operation for full spectrum capture may be at lower frequencies and at lower powers than other wireless technologies, antennas with poor characteristics may be utilized by equalizing the power provided to the antenna. In this manner, the power from the antenna may be maximized without violating any Federal Communications Commission (FCC) constraints. A sensor may be implemented to detect or sense the impedance of the antenna across a range of frequencies. The output from the sensor may be provided as feedback for digital processing to enable sub-carrier equalization in order to obtain an optimal power transfer out of the antenna. For example, at frequencies where the antenna performance is poor (e.g., 10% efficiency), the power may be increased to overcome the inefficiencies. Since only a few frequencies may require additional power to compensate for the inefficiencies, the overall power transmitted may still be within FCC requirements. For example, power for certain frequencies may be increased by as much as 30 dB while the overall power transmitted remains within FCC requirements. In some instances, there may be a correspondence between the frequencies at which the transmit antenna has poor performance and the frequencies at which the receive antenna has poor performance. This correspondence may be utilized for purposes of antenna equalization. Antenna equalization may comprise over-compensation and/or under-compensation at one or more frequencies based on the characteristics of the transmit antenna and/or the receive antenna.

In order to combine the phase carriers, equalization may need to be performed. To utilize equalization, there may be known pilot symbol patterns, which may be scattered throughout the portion of the spectrum being considered. The pilot symbols may be at a known phase and are not randomized nor modulated by a data stream. The whole channel may be equalized based on these pilot symbols, which enables phase recovery. By utilizing pilot symbols, OFDM or WCDMA techniques may be supported for the modem portion described above. In broadcast, OFDM techniques may be utilized in which pilot symbols or pilot tones may be picked up, the pilot symbols or pilot tones being fixed or scattered and rotated over time. WiFi on the other hand, may utilize preambles and/or pilot symbols to enable synchronization.

In an exemplary embodiment of the invention, high receive gain may also be achieved by aiming the antenna in a particular direction. For full spectrum capture in personal area networks, for example, omni-directional antennas for both transmit and receive operations may be more suitable than asymmetric antennas. On the other hand, for communicating or penetrating across a wall for indoor dwelling or other like barrier, an asymmetric antenna configuration may be more suitable for full spectrum capture since it may be preferable to receive in one direction and not the other.

The transmission characteristics of a remote antenna or coil may be represented and/or modeled by the block labeled area of transmission (AT), while the reception characteristics of a local antenna or coil may be represented and/or modeled by the block labeled area of receiving (AR). In an exemplary embodiment of the invention, the remote antenna may also have reception characteristics and the local antenna may also have transmission characteristics.

In one embodiment of the invention, synchronization may occur by utilizing a standard frequency pattern for the antenna when a lower coding rate with more coding protection is being utilized. Once two devices are synchronized, the devices may start a negotiation to optimize the channel. For example, each device may provide antenna performance information and/or channel conditions information to the other device based on an information conveyance protocol. By utilizing the protocol information, impedance sensing, and signal processing, the channel conditions may be identified and considered when determining the transmit power distribution across antenna frequencies. In this regard, the devices may be operable to perform signal processing algorithms that allow the devices to dynamically determine local and remote antenna characteristics, and/or channel conditions or impairments, including the presence of blockers or interferers, for example. A tracking scheme may be implemented for exchanging channel and/or antenna characteristics, which may include a preamble, a pattern field, and/or decoding rate information. These operations may be performed at the PHY and/or MAC layers, for example, through the DSP/Modem/CPU unit 330.

Some of the techniques described above may be applied to overcome the poor performance that some antennas may have over a wide spectrum. The wide spectrum requirements of full spectrum capture are such that the ratio of the lower frequencies to the higher frequencies is higher than a similar ratio for ultra-wideband (UWB), for example. As a result, antenna characteristics over the wide spectrum of full spectrum capture operation may be continuously monitored and considered where such operations may not be needed for UWB.

In an exemplary embodiment of the invention, other wireless technologies, for example, ZigBee, Bluetooth, WLAN, and WiMax, may be supported in addition to full spectrum capture. In this regard, a separate and/or better antenna may be needed to support TDD for Bluetooth, for example, at least on the receive path 320. The transmit path 310 may be a reverse implementation of the receive path 320. In ZigBee, Bluetooth, WLAN, and WiMax, there may be mixing and filtering operations at the front end that allows the signal path to have a narrower band than full spectrum capture, which in turn may benefit from a dedicated antenna.

In an embodiment of the invention, other wireless technologies such as, for example, ZigBee, Bluetooth, WLAN, and WiMax may coexist with full spectrum capture in the same BNC/FSC enabled device 200. In this regard, coexistence operations may be supported. Two or more receive antennas may be utilized, each of which receives signals from different wireless technologies such as, for example, ZigBee, Bluetooth, WLAN, and WiMax. Each of the received signals may be processed or filtered before they are all combined and digitally converted for full spectrum capture operations. In addition, utilizing device components such as the ADC 322b and/or the DAC 322a, which require less power, may enable multimode devices. In an exemplary embodiment of the invention, multimode devices such as the BNC/FSC enabled device 200 may utilize full spectrum capture as a single radio to support multiple modes or as a universal interface by having one or more of the analog components, such as the filters, for example, be band-selectable or tunable. The data converter may still run at the appropriate rate to enable handling of the filtered data. In this regard, the full spectrum capture may be utilized for Bluetooth, IEEE 802.11, and/or WiFi communications.

In some embodiments of the invention, a delta-sigma bandpass converter may be utilized in connection with the ADC 322b such that the sampling may have a transfer function that peaks at a certain frequency and drops off at other frequencies. By having a converter that has a band-pass transfer function and not a low-pass transfer function it, the ADC 322b may be configured to perform conversion operations utilizing less power.

Operating full spectrum capture at higher frequencies, such as 5 GHz or 10 GHz, for example, based on an efficient ADC and/or DAC, may support capture or reception of IEEE 802.11 signals. The filtering and processing may be performed digitally. In some instances, the front-end of the full spectrum capture may be made coarsely tunable to be able to remove, in the analog domain, certain frequencies, bands, and/or unwanted intermediate data. Such an approach may provide an improvement in dynamic range. Digital signal processing may then be utilized for any further filtering operations that may be needed.

In an embodiment of the invention, the full spectrum capture may be implemented without mixers. In this regard, the data pipe may remain large until the data becomes digital. In addition, not having mixers in full spectrum capture may remove additional components in the transmit path 310 and the receive path 320 that may result in a lowered dynamic range. Distortion and/or noise performance may also be improved since mixers are not included in the transmit path 310 and the receive path 320.

The diplexer 314 may comprise suitable logic, circuitry, interfaces and/or code that may be operable to reduce the likelihood that signal transmission may saturate the receive path 320. The diplexer 314, however, may not be needed when very low power levels are utilized over a wide bandwidth, as may occur during full spectrum capture operations. In such instances, transmission and reception of signals may occur concurrently without having signal transmission interfere with signal reception. In some embodiments of the invention, a switch may be utilized instead of the diplexer 314 to switch between transmission and reception in TDD communications.

The transmit filter 318a and the receive filter 318b may comprise suitable logic, circuitry, interfaces and/or code that may be operable to provide or perform spectral filtering to support full spectrum capture operations. In this regard, the transmit filter 318a and the receive filter 318b may be utilized to filter frequencies outside the full spectrum capture frequency range. In some instances, the characteristics of the antenna (e.g., coil) may be such that it may perform filtering functions and, in those instances, transmit and/or receive filters may not be needed.

The DAC 322a and the ADC 322b may comprise suitable logic, circuitry, interfaces and/or code that may be operable to perform Digital to Analog data generation or conversion and Analog to Digital data collections, respectively. In an exemplary embodiment of the invention, the DAC 322a and the ADC 322b may be operable to perform high speed digital-to-analog and analog-to-digital conversion, respectively. In this regard, the DAC 322a and the ADC 322b may be operable at very high speeds to enable full spectrum capture. The digital signals produced by the ADC 322b and received by the DAC 322a may be referred to as digital baseband signals. The DAC 322a and the ADC 322b may be communicatively coupled to the DSP/modem/CPU unit 330.

The various variable gain amplifiers 316a and 320a, and 316b and 320b may comprise suitable logic, circuitry, code, and/or interfaces that may be operable to have the gain that may be applied by the variable gain amplifier 316a, for example, to an input signal be programmable or controlled. One or more of the variable gain amplifiers in the transmit path 310 may comprise power amplifiers, while one or more of the variable gain amplifiers in the receive path 320 may comprise low-noise amplifiers. The various variable gain amplifiers 316a and 320a, and 316b and 320b may be operable to handle low levels of power spread over a wide bandwidth to support full spectrum capture operations.

The DSP/Modem/CPU unit 330 may comprise circuitry that may comprise a digital signal processor (DSP) portion 332, a modulator-demodulator (modem) portion 334, and/or a central processing unit (CPU) 336. The DSP portion 332 may comprise suitable logic, circuitry, code, and/or interfaces that may be operable to clean up signals. For example, the DSP portion 332 may be operable to perform channel selection and/or filtering, digital scaling, and/or rate conversion. The rate conversion or sample rate conversion may be performed utilizing variable rate interpolators. For example, a 13.5 Megahertz (MHz) signal that is received may be interpolated down to a 13.3 MHz signal during rate conversion operations.

The modem portion 334 may comprise suitable logic, circuitry, code, and/or interfaces that may be operable to perform synchronization, equalization and/or demapping, and/or channel encoding when processing received signals. The channel decoder may utilize a concatenated code such as an inner code and an outer code. An example of such a concatenated code may comprise a low-density parity-check (LDPC) code followed by a Bose-Chaudhuri-Hocquenghem (BCH) code. The channel decoder may utilize a concatenated code that comprises a Viterbi code, for example. The modem portion 334 may also be operable to perform channel encoding and/or equalization, and/or mapping when processing signals for transmission. During transmission, synchronization is typically not needed. The operation of the modem portion 334 may be implemented using an orthogonal frequency-division multiplexing (OFDM) approach or an approach based on code division multiple access (CDMA).

The CPU portion 336 may comprise suitable logic, circuitry, code, and/or interfaces that may be operable to support MAC layer and/or Link layer operations for full spectrum capture. The MAC layer may support the ability to share the medium, which utilizing full spectrum capture allows the medium to be shared with fewer collision type issues. For example, when everyone is sending less than the full bandwidth (e.g., 1 GHz), the operation may be easier than if everyone is trying to send close to the full bandwidth, in which case some form of negotiation between devices may be supported by the MAC layer.

The MAC layer and the Link layer enable access sharing, which may use OFDM techniques or some form of CDMA as described above. Simple CDMA techniques may also be used. For CDMA-like operations, low-power multiple phase carriers may be sent, such as 8 k, 10 k, 12 k, 32 k, or 64 k, for example. Each of the phase carriers may have a random phase. When the random phase is known, a scan or search may be performed for those known phase carriers. In some instances, there may be one or more preset channels for each search. Since the power utilized in full spectrum capture is typically very low, the search or scan goes through each of the channels. If the different phase carriers are combined, it may be possible to obtain a significant coding or dispreading gain. OFDM techniques may provide, at least in some instances, an approach in which some of the sub-channels may be left out or left unused, especially when it is known that those channels may have some form of interference. For example, it may be preferable not to transmit in certain channels that are known to be dead and/or where it may be preferable to ignore information from a channel that has noise and is likely to degrade the performance of the combined signal.

In some embodiments of the invention, the spectral bandwidth corresponding to full spectrum capture operations may extend to a frequency (e.g., $f_{FSC}$) of approximately 1 Gigahertz (GHz), for example. The full spectrum capture spectral bandwidth may depend on the frequency of operation of the ADC 322b and/or of the DAC 322a. If the ADC 322b and/or the DAC 322a is operable to capture 10 GHz of bandwidth, for example, full spectrum capture at or near 10 GHz may be performed.

In an exemplary embodiment of the invention, the BNC/FSC enabled device 200 may comprise one or more other receive paths 321a-321n in addition to the receive path 320 with full spectrum capture. In this regard, the one or more other receive paths 321a-321n may comprise components for handling received signals via WiFi, WiMax, ZigBee, RFID, and/or Bluetooth. In an exemplary embodiment of the invention, when supporting additional wireless technologies, such as Bluetooth and/or WiFi, for example, a portion of the receive path 320 with full spectrum capture may be coupled to the one or more other receive paths 321a-321n. In other words, the BNC/FSC enabled device 200 may be configured to utilize different RF front ends to support communication via additional wireless technologies. In an exemplary embodiment of the invention, the BNC/FSC enabled device 200 may be configured to utilize a single RF front end to handle communication via BNC/FSC, WiFi, WiMax, ZigBee, RFID, BNC and Bluetooth.

In one embodiment of the invention, a device such as the BNC/FSC enabled device 200 may support a processing path for full spectrum capture and another processing path for narrowband communication. The device may be operable to switch between the two based on the operation of the BNC/FSC enabled device 200. Moreover, when switching to the narrowband communication processing path, the amount of power under consideration may drop from the amount of power being handled by the full spectrum capture processing path. The narrowband communication processing path may share some components with the full spectrum capture processing path such as low-noise amplifiers 316a, 316b, 320a and 320b.

Figure 4:
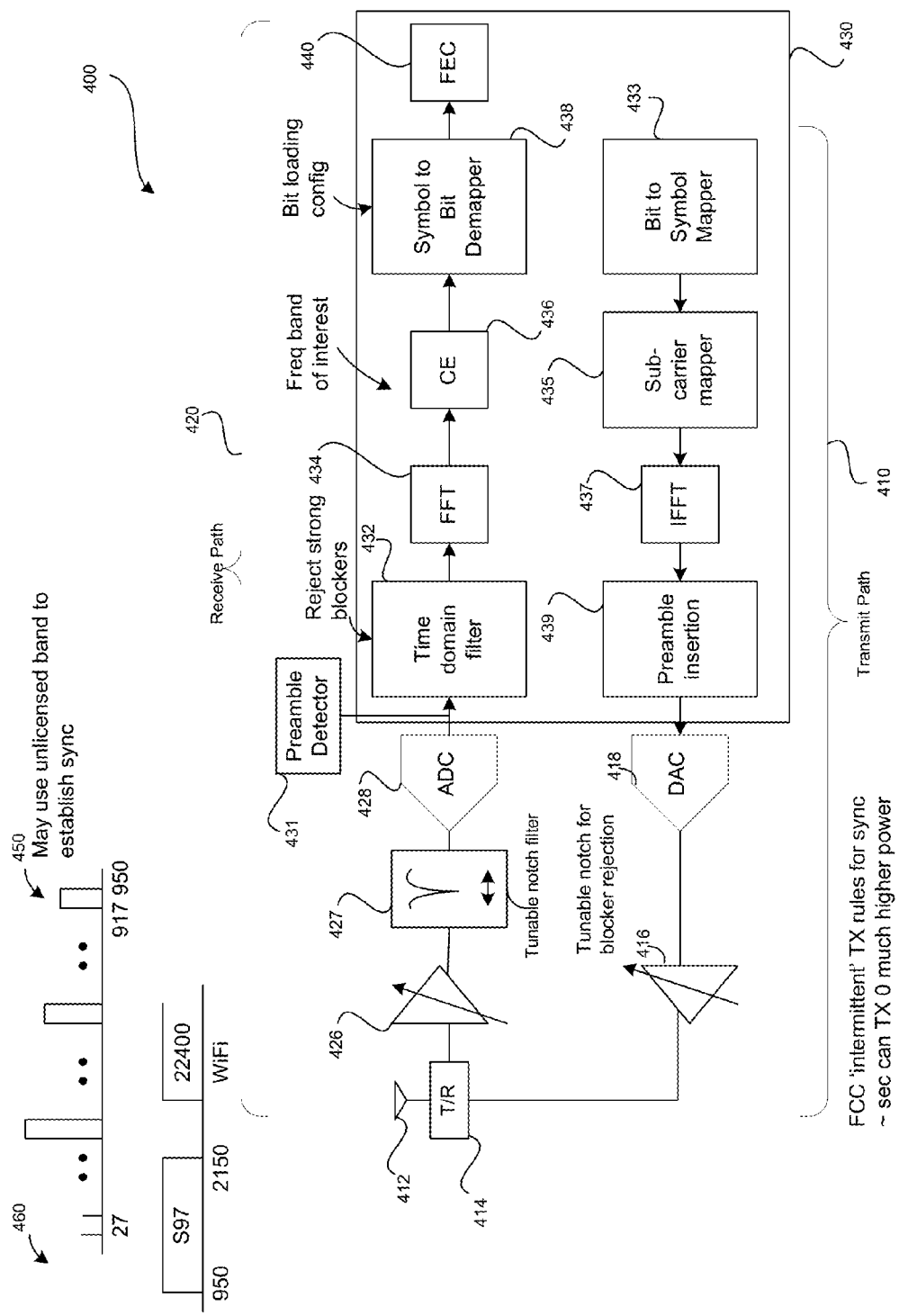
FIG. 4 is a block diagram that illustrates an exemplary implementation for a controller, such as a Broadband Near Field Communication (BNC) controller for example, that utilizes a tunable notch filter in a receive path with full spectrum capture (FSC), in accordance with an exemplary embodiment of the invention.

FIG. 4 is a block diagram that illustrates an exemplary implementation for a controller, such as a Broadband Near Field Communication (BNC) controller for example, that utilizes a tunable notch filter in a receive path with full spectrum capture (FSC), in accordance with an exemplary embodiment of the invention. Referring to FIG. 4, there is shown a controller 400, which may be a hybrid BNC/FSC controller. The hybrid BNC/FSC controller 400 may comprise a transmit path 410, a receive path 420, and a DSP/Modem/CPU unit 430. In addition, the transmit path 410 may comprise a variable gain amplifier 416 and a DAC 418. The receive path 420 may comprise a variable gain amplifier 426, a tunable notch filter 427, and an ADC 428. The transmit path 410 and the receive path 420 may be coupled to the same antenna 412 through a transmit-receive (T/R) switch 414. In this regard, the variable gain amplifiers 416 in the transmit path 410 may be turned off during receive, and the variable gain amplifiers 426 in the receive path 420 may be turned off during transmit. The antenna 412, the variable gain amplifiers 416 and 426, the DAC 418 and the ADC 428 may be similar to the BNC power inductive coupling unit 312, the variable gain amplifiers 316b, 320a, the DAC 322a, and the ADC 322b of FIG. 3, respectively.

The T/R switch 414 may comprise suitable logic, circuitry, interfaces and/or code that may be operable to switch between transmit and receive. In some embodiments of the invention, the T/R switch 414 may be positioned or placed between the variable gain amplifier 426 and the tunable notch filter 427 in the receive path 420. In some instances, since the power being transmitted may be low enough, the T/R switch 414 may not be needed.

The tunable notch filter 427 may comprise suitable logic, circuitry, code, and/or interfaces that may be operable to reject a blocker or interference signal. The blockers may be strong and saturate the ADC 428. In this regard, the tunable notch filter 427 may be utilized to remove the strongest blocker. The tunable notch filter 427 may be implemented on-board or on-chip, for example. For high frequencies, the tunable notch filter 427 may be on-chip, and for low frequencies, it may be off-chip. While the tunable notch filter 427 may affect the frequencies that are adjacent to the frequency being removed, the full spectrum capture spectrum overall may not be significantly affected because of the broadband nature of full spectrum capture. Sensing circuitry may be utilized to detect the strong blockers and provide feedback to adjust the frequency of the tunable notch filter 427.

The receive path 420 may also comprise a preamble detector 431, a time-domain filter 432, a Fast Fourier Transform (FFT) block 434, a channel equalizer (CE) 436, a symbol to bit demapper 438, and/or a forward error correction (FEC) block 440. The preamble detector 431 may comprise suitable logic, circuitry, code, and/or interfaces that may be operable to detect OFDM symbols in time domain from time domain samples from the tunable notch filter 427. The time-domain filter 432 may comprise suitable logic, circuitry, code, and/or interfaces that may be operable to reject strong blocker signals. The FFT block 434 may comprise suitable logic, circuitry, interfaces and/or code that may be operable to perform Fast Fourier Transform (FFT) over OFDM symbols from the time domain filter 432. The FFT block 434 may be operable to convert time domain samples of the OFDM symbols to corresponding frequency domain samples for frequency domain channel equalization via the CE 436. The CE 436 may comprise suitable logic, circuitry, code, and/or interfaces that may be operable to provide channel equalization for frequency bands of interest utilizing frequency domain samples supplied from the FFT block 434. The symbol to bit demapper 438 may comprise suitable logic, circuitry, code, and/or interfaces that may be operable to perform bit-loading configuration.

The transmit path 410 may also comprise a bit to symbol mapper 433, a sub-carrier mapper 435, an Inverse Fast Fourier Transform (IFFT) block 437, and/or a preamble insertion block 439. The bit to symbol mapper 433 may comprise suitable logic, circuitry, code, and/or interfaces that may be operable to perform symbol-loading configuration. The sub-carrier mapper 435 may comprise suitable logic, circuitry, code, and/or interfaces that may be operable to map sub-carriers to avoid regulated frequencies. The avoidance of regulated frequencies may be binary or graduated. The IFFT block 437 may comprise suitable logic, circuitry, interfaces and/or code that may be operable to perform Inverse Fast Fourier Transform (IFFT) over frequency domain samples of OFDM symbols from the sub-carrier mapper 435. The IFFT block 437 may be operable to convert frequency domain samples of the OFDM symbols to corresponding time domain samples. The preamble insertion block 439 may comprise suitable logic, circuitry, code, and/or interfaces that may be operable to insert a preamble into time domain samples from the IFFT block 437 in a manner that deals with frequency avoidance.

Although OFDM-based implementation is illustrated for full spectrum capture, the invention may not be so limited. Accordingly, other wireless technologies such as CDMA technology and WCDMA (spread spectrum approach) technology may also be utilized for full spectrum capture without departing from the spirit and scope of various embodiments of the invention.

In an exemplary embodiment of the invention, on the receive path 420, the variable gain amplifier 426, as a LNA typically drives the very fast ADC 428 in order to achieve full spectrum capture performance. The full spectrum capture operations may be typically used with packet-based systems. In an exemplary embodiment of the invention, the full spectrum capture operations may comprise having a MAC layer picking which frequency bands are to be used and coordinating that information with the device front-end. The MAC layer may also determine and/or coordinate bit loading, for example. In this regard, the MAC layer may determine which frequencies have good signal-to-noise ratio (SNR) and which ones do not, and may allocate more bits to the ones with good SNR than to those with lower SNR.

In an exemplary embodiment of the invention, on the transmit path 410, there may be frequency ranges in which the full spectrum capture may not want to transmit. For example, the full spectrum capture may be explicitly prohibited by regulatory rules from transmitting in certain frequencies. In another example, the BNC/FSC enabled device 200 may sense that a television channel is being used and may not want to transmit in that frequency. As described above, the avoidance of certain frequencies may be implemented in a binary or graduated fashion. For example, in a binary case, transmission at a certain frequency or note may be ON or OFF. For the graduated case, the power level of the transmitted signal may be based on how strong other signals are in that same frequency. For example, the power level may be stronger for transmission at the frequency of the television channel when the signal strength of the television channel is low, which may indicate that the signal is far away.

To start communication between two devices, a time reference may be established and there may be an agreement about which frequencies are to be utilized. In an exemplary embodiment of the invention, various ways in which synchronization may be supported may be utilized by the hybrid BNC/FSC controller 400. For example, the hybrid BNC/FSC controller 400 that supports full spectrum capture may awake and look for preambles or beacons of some sort. This approach may consume a lot of power. In another example, both sides, that is, the two peer devices that are to communicate, look at one or more pulse per second (PPS) signals used in global positioning systems (GPS). When any one device wakes up, it may be realigned based on a PPS signal. In some instances, the PPS signal that may be utilized for synchronization is from another device that is nearby. This type of synchronization may occur even when there is a lot of drift and/or when there is some degree of inaccuracy with the PPS signal. In some embodiments of the invention, there may be an indication received or generated by the device of how accurate the PPS signal is in order to determine whether the PPS signal is suitable for synchronization.

In an exemplary embodiment of the invention, the hybrid BNC/FSC controller 400 may utilize unlicensed bands to establish synchronization. In this regard, synchronization information may also be provided in an unlicensed band, such as the cordless region 450, for example, between 917 MHz and 950 MHz. The hybrid BNC/FSC controller 400 may look into this region of the spectrum to find synchronization information. Similarly, frequencies down at around 27 MHz (e.g., frequencies for operation of garage door openers) 460 may be utilized by devices looking for synchronization information.

In some embodiments of the invention, the two peer devices looking to synchronize may operate based on an established agreement on time regarding how long to look for a neighbor to synchronize. Since synchronization may take some time at relatively large power levels, looking for a neighbor for a long period of time may result in power being drained from the searching device.

In an embodiment of the invention, preset OFDM symbols with randomized phases may be utilized in a correlation operation to enable synchronization with another device. With OFDM enabled, when a preamble is utilized, the preamble may typically cover the entire frequency band. The preamble may need to be changed to avoid certain frequencies as determined by regulatory rules and/or operating conditions. The preamble may then be implemented before the FFT block 434 in the receive path 420. Both sides may need to be aware of the preamble characteristics in order to enable communication between them.

In an exemplary embodiment of the invention, the full spectrum capture may provide very short duty cycles for low power. In this regard, FCC intermittent burst allows for the transmission, at the packet level, of much higher power during short burst. The amount of power that is provided may be based on the frequency.

Figure 5:
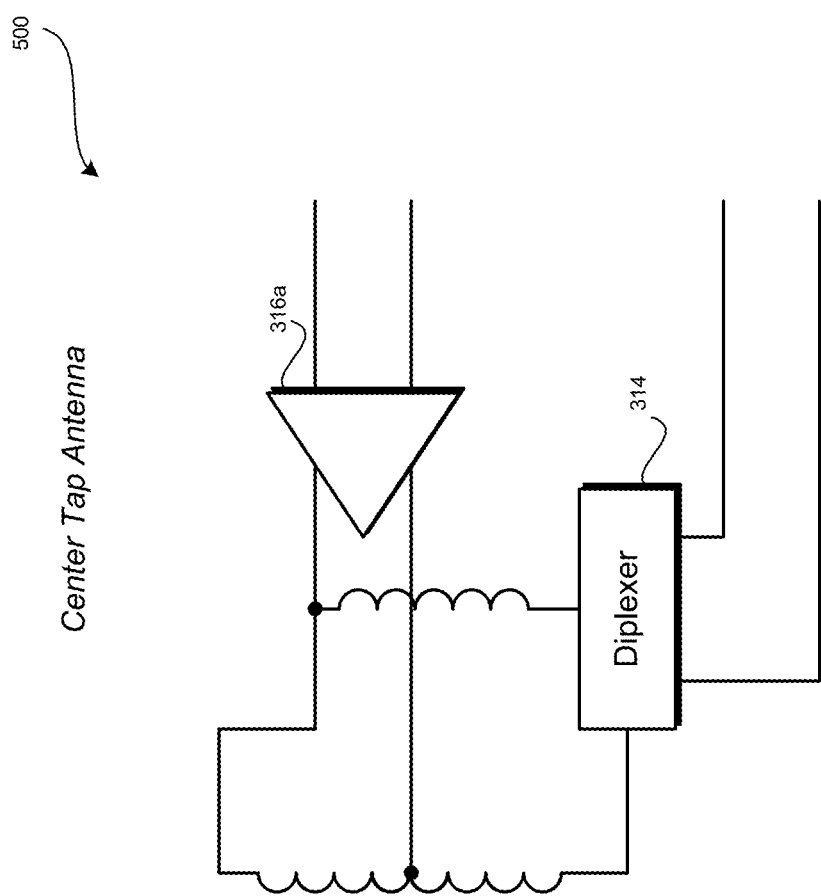
FIG. 5 is a block diagram that illustrates an exemplary center tap antenna that is utilized for full spectrum capture (FSC) in, for example, Broadband Near Field Communication (BNC), in accordance with an exemplary embodiment of the invention.

FIG. 5 is a block diagram that illustrates an exemplary center tap antenna that is utilized for full spectrum capture (FSC) in, for example, Broadband Near Field Communication (BNC), in accordance with an exemplary embodiment of the invention. Referring to FIG. 5, there is shown a center tap antenna 500. The center tap antenna 500 may be designed or implemented such that the impedance circuitry and the voltage circuitry may be directly coupled to the center tapping of the whole coil (antenna).

Figure 6:
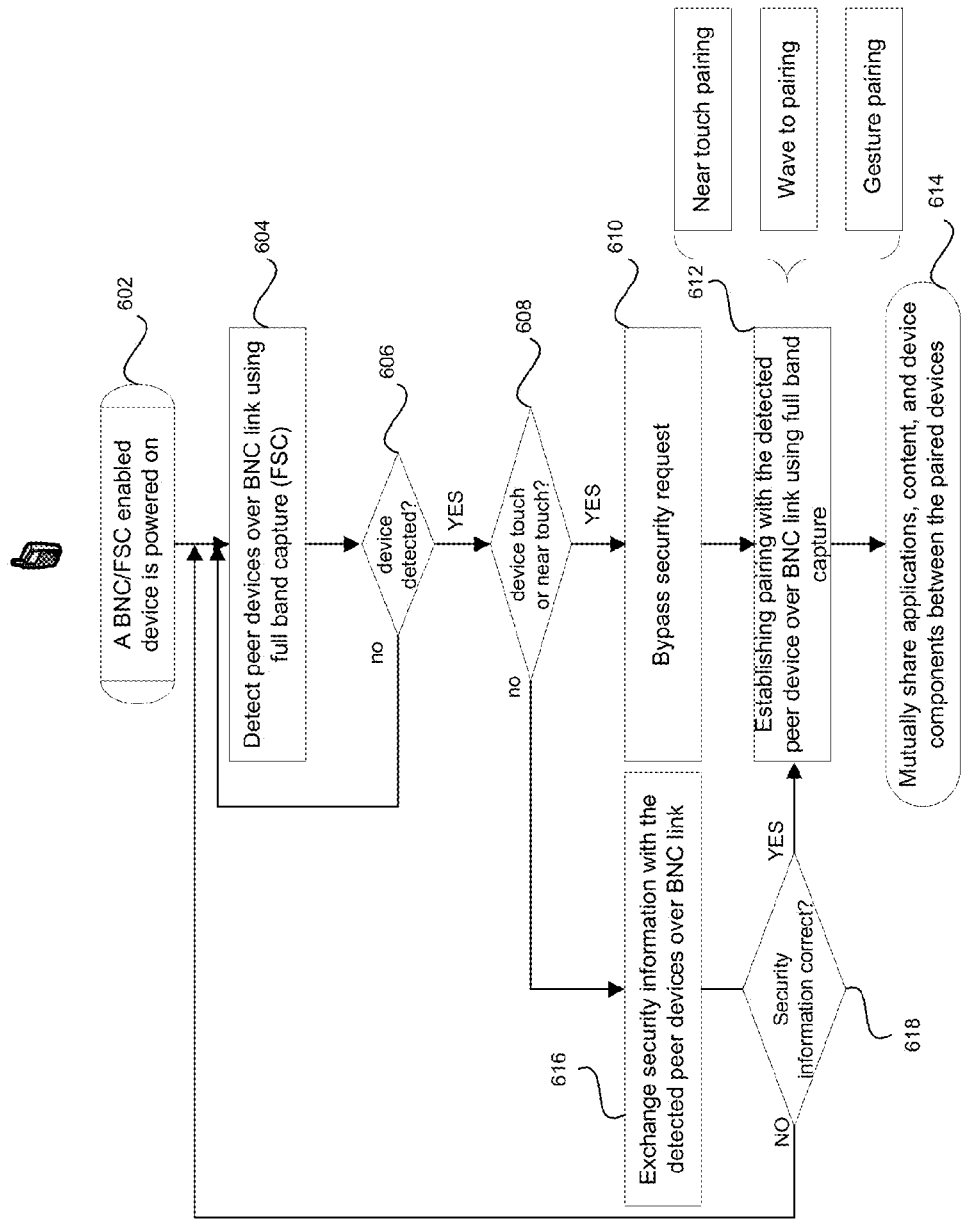
FIG. 6 is a flow diagram that illustrates exemplary steps for device pairing and security in, for example, Broadband Near Field Communication (BNC) utilizing full spectrum capture (FSC), in accordance with an exemplary embodiment of the invention.

FIG. 6 is a flow diagram that illustrates exemplary steps for device pairing and security in, for example, Broadband Near Field Communication (BNC) utilizing full spectrum capture (FSC), in accordance with an exemplary embodiment of the invention. Referring to FIG. 6, in step 602, a BNC/FSC enabled device such as the BNC/FSC enabled device 200 is powered on. The exemplary steps start in step 604, where the BNC/FSC enabled device 200 may be operable to detect peer devices over BNC link utilizing full spectrum capture. For example, the BNC/FSC enabled device 200 may monitor signals or messages received via the BNC power inductive coupling unit 312 for device-identifying reference information such as a MAC-ID, MSN or a peer address in the communication network, where the pairing takes place. In step 606, the BNC/FSC enabled device 200 may determine whether peer BNC/FSC enabled devices are detected over a BNC link. In instances where one or more peer BNC/FSC enabled devices are detected, then in step 608, the BNC/FSC enabled device 200 may determine whether it touches or nearly touches the detected peer BNC/FSC enabled devices. In instances where the BNC/FSC enabled device 200 touches or nearly touches the detected peer BNC/FSC enabled devices, then in step 610, the BNC/FSC enabled device 200 may bypass security request. In other words, the BNC/FSC enabled device 200 may not exchange or communicate security information with the detected peer BNC/FSC enabled devices. The security information may comprise user account names and logo, password, PIN number and other credentials, security categories, encryption keys, cryptographic keys, an authentication value and sequence number, signatures to be included, digital certificates, source IP address, destination IP address, and/or port numbers.

In step 612, the BNC/FSC enabled device 200 may be operable to establish pairing with each of the detected peer BNC/FSC enabled devices over a BNC link using full spectrum capture. The pairing may comprise near touch pairing, wave to pairing and gesture pairing. Touch or near touch pairing refers to pairing the BNC/FSC enabled device 200 with a peer BNC/FSC enabled device by simply touching or near touching the two BNC/FSC enabled devices to be paired or connected to the network. Wave to pair enables the pairing of two BNC/FSC enabled devices when they are within certain proximity of each other, for example, ¼ of a wavelength of each other. In this regard, one device may be waved next to the other within the distance of ¼ wavelength to accomplish pairing. In one embodiment of the invention, the waving may have to occur in a specific manner or pattern to effectively pair the two BNC/FSC enabled devices. If the waving is not done in that specific manner or pattern, then no pairing is done and the devices may not communicate with each other or will not communicate secure information with each other. This is done, for example, to avoid unintended pairings based simply on proximity in crowded environments. This signature for waving or waving in a particular pattern may be referred to as gesture or signature pairing. In this regard, the device would not only need to be within certain proximity, but also would need to be moved or waived in a pre-defined manner, during which the devices are brought into such proximity. The BNC/FSC enabled devices may take advantage of existing motion/directional devices, such as a gyroscope, to capture a unique gesture or signature for each user, and only pair the communication device if that gesture or signature is detected during a proximity event.

In step 614, the BNC/FSC enabled device 200 may mutually share applications, multimedia content or files, and device components such as display with the detected peer BNC/FSC enabled devices. In this regard, sharing of the display, multimedia content or files may occur among the BNC/FSC enabled device 200 and the detected peer BNC/FSC enabled devices regardless of who is receiving the display content. For example, a user of BNC/FSC enabled device 200 at a mall may take a picture and share the screen, which displays the picture, with all their friends who are standing there. In this regard, the user is not concerned whether someone is eavesdropping and is viewing the picture. The BNC/FSC enabled device 200 may be controlled so the signals are not communicated beyond a certain range.

In an exemplary embodiment of the invention, a secure communication session may be established for paired devices based on proximity. In this regard, devices may be excluded from the secure communication session if they are located outside that proximity.

In step 606, in instances where no peer BNC/FSC enabled device is detected, then the exemplary steps return to step 604.

In step 608, in instances where the BNC/FSC enabled device 200 does not touch or near touch the detected peer BNC/FSC enabled devices, then in step 616, where the BNC/FSC enabled device 200 may exchange security information with the detected peer devices over BNC link. In step 618, the BNC/FSC enabled device 200 may determine whether the security information from the detected peer devices is correct. In instances where the received security information is correct, then exemplary process continues in step 612. Otherwise the exemplary steps return to step 604.

Figure 7:
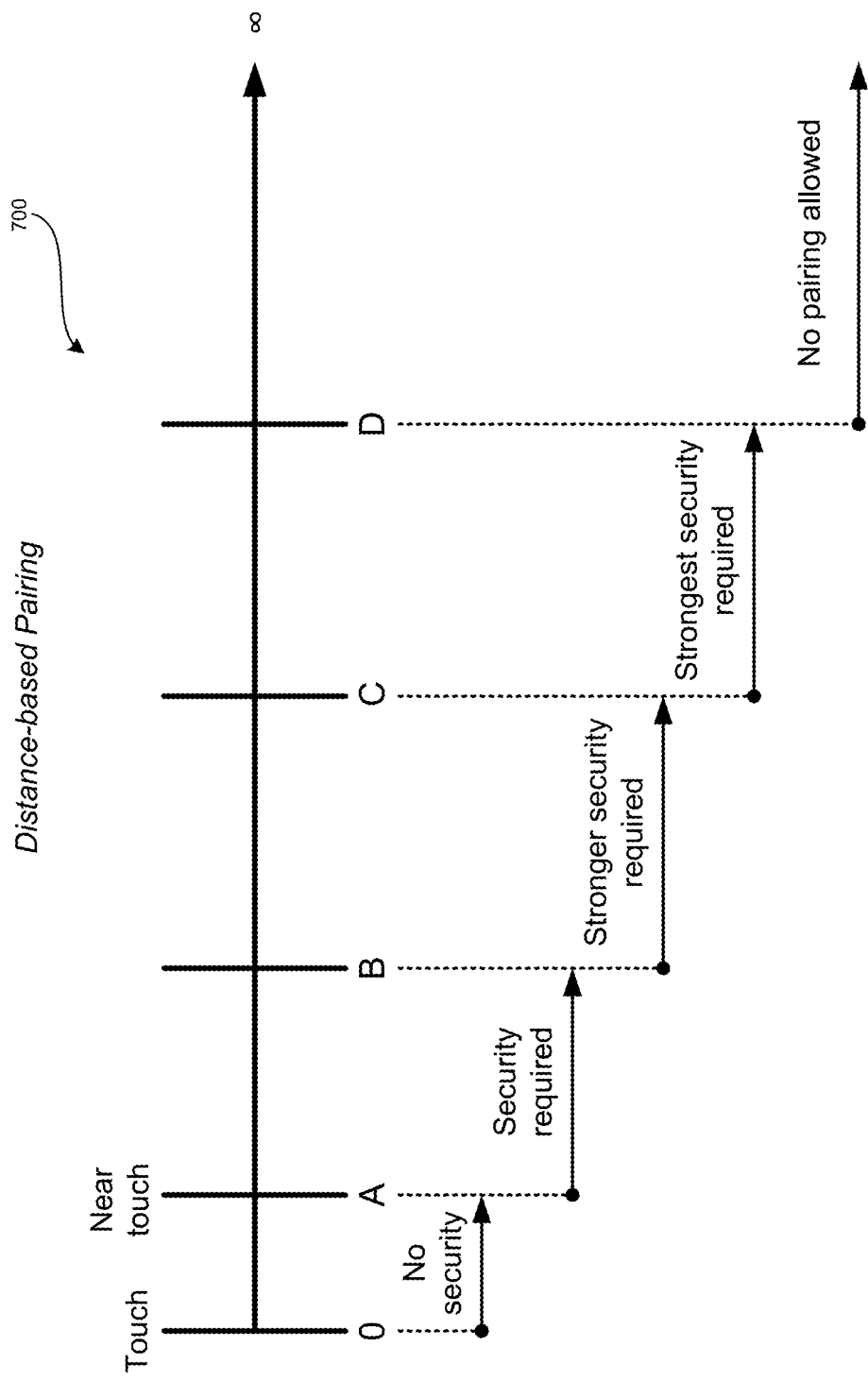
FIG. 7 a flow chart illustrating exemplary distance-based pairing of devices, such as BNC/FSC devices for example, in accordance with an exemplary embodiment of the invention.

FIG. 7 a flow chart illustrating exemplary distance-based pairing of devices, such as BNC/FSC devices for example, in accordance with an exemplary embodiment of the invention. Referring to FIG. 7, there is shown a distance-based pairing 700. In various exemplary embodiments of the inventions, a sliding scale may be utilized for secured pairing. In this regard, the two BNC/FSC enabled devices that are to be paired may be placed very close to each other and their power may be controlled to the point where they may just hear each other and thus may not be heard by any other listening device. At that point, security information such as keys may be exchanged and the two devices paired using full spectrum capture. In an exemplary embodiment of the invention, depending on distance between the two BNC/FSC enabled devices, different levels of security may be applied for pairing. In this regard, pairing may occur at varying distances. The closer together the two BNC/FSC enabled devices are, the lesser the security that is needed. On the other hand, the further apart two BNC/FSC enabled devices are, the greater the security that is needed for pairing. For example, if the two BNC/FSC enabled devices, between 0 and A, are touching or near touching, then no security request is needed. In other words, users of the two BNC/FSC enabled devices do not care whether the content is communicated without security, so long as the communication occurs and/or occurs within a certain range (between 0 and A). If the two BNC/FSC enabled devices, between A and B, are near touching, then a first security scheme may be utilized. If the two BNC/FSC enabled devices are between B and C, 5 cm apart, for example, a second security scheme may be utilized, where the second security scheme may be stronger than the first security scheme. If the two BNC/FSC enabled devices are between B and C, 20 cm apart, for example, a third security scheme may be utilized, where the third security scheme may be stronger than the second and the first security schemes. If the two BNC/FSC enabled devices are beyond D, greater than 100 cm, for example, no pairing may be allowed.

A security scheme may comprise data categories that may be communicated between the two BNC/FSC enabled devices. In an exemplary embodiment of the invention, the two BNC/FSC enabled devices may be operable to communicate secure data only when the two BNC/FSC enabled devices are located at a certain distance. For example, the two BNC/FSC enabled devices may only communicate data when they are located at one meter or less apart. If the two BNC/FSC enabled devices are located at a distance greater than one meter, they may communicate only non-secure data. If the two BNC/FSC enabled devices are located more than 2 meters apart, then they may not communicate at all. The two BNC/FSC enabled devices may only know the channel between the two BNC/FSC enabled devices and both devices share the same spectrum.

Another embodiment of the invention may also provide a layered approach for data communication between the two BNC/FSC enabled devices. In this regard, data may be assigned to a particular layer and only data that is in a particular layer may be communicated based on the distance. A data type may specify what kind of data is in each particular layer. For example, secure data in layer 1 may only be communicated when both devices are less than ½ meter apart. Non-secure data in layer 2 may only be communicated in instances when both devices are less than or equal to 1.5 meters apart. Non-secure data in layer 3 may only be communicated in instances when both devices are less than or equal to 2 meters apart. Non-secure data in layer 4 may only be communicated in instances when both devices are less than or equal to 2.0 meters apart, and so on.

Devices may be identified by, for example, MAC addresses. If a known or trusted device is within a certain range, then communication may be permitted with little or no security based on the device identity. However, once the trusted device is out of range, then security may be required to facilitate communication. For example, a successful challenge may be required for communication to occur.

Figure 8:
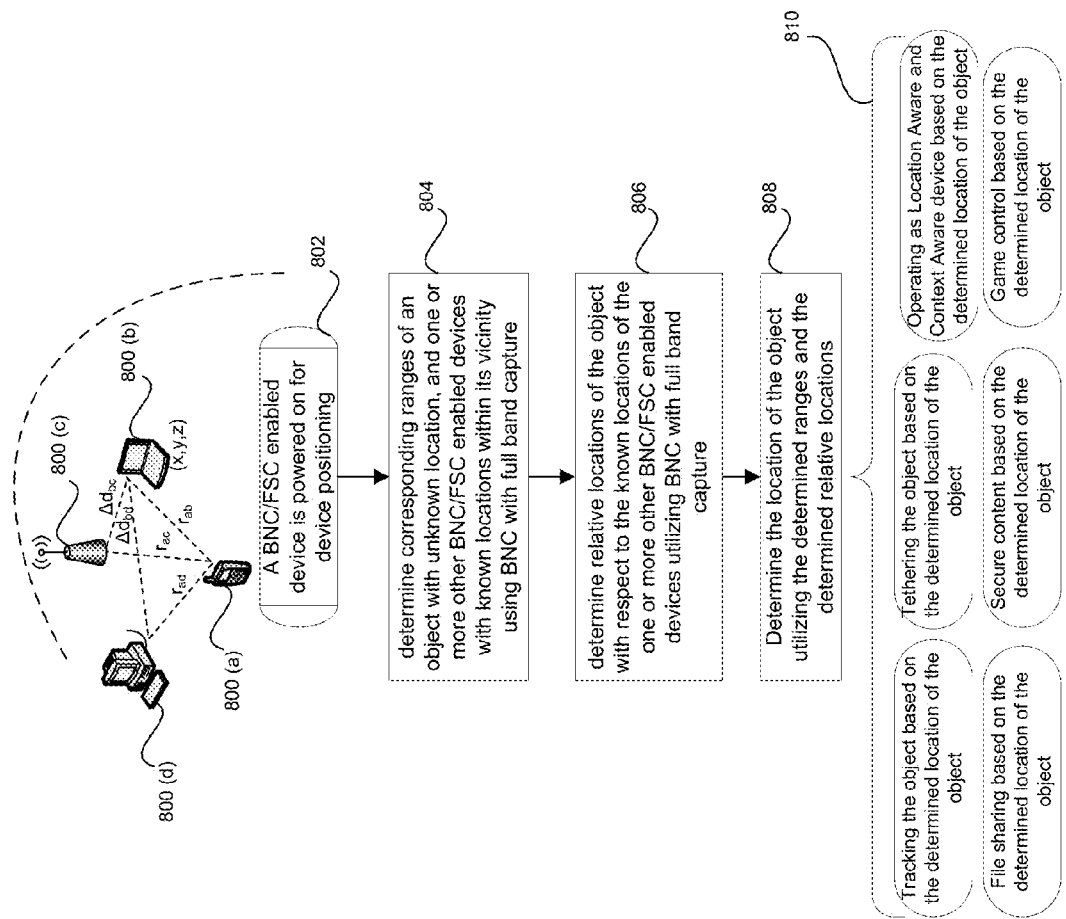
FIG. 8 is a flow diagram that illustrates exemplary steps for positioning an object using, for example, Broadband Near Field Communication (BNC) with full spectrum capture (FSC), in accordance with an exemplary embodiment of the invention.

FIG. 8 is a flow diagram that illustrates exemplary steps for positioning an object using, for example, Broadband Near Field Communication (BNC) with full spectrum capture (FSC), in accordance with an exemplary embodiment of the invention. Referring to FIG. 8, in step 802, a BNC/FSC enabled device 800(*a*) is powered on to determine the position of an object, for example, a BNC/FSC enabled device 800(*b*), within its vicinity. Also, within the vicinity of the BNC/FSC enabled device 800(*a*), there may be one or more other BNC/FSC enabled devices with known positions. The one or more other BNC/FSC enabled devices may comprise access points (APs), RFID tags, and other BNC/FSC enabled devices within the vicinity of the BNC/FSC enabled device 800(*a*). In an exemplary embodiment of the invention, hybrid BNC/FSC solutions may be utilized to give or provide a more precise location of an object without relying on received signal strength. A duty cycle burst of low power energy over a large bandwidth may be utilized to determine the range or position of an object or person. In this regard, the hybrid BNC/FSC solutions may be utilized to tell whether an object may have been moved from its current location by, for example, 2 centimeters. This distance may vary based on the BNC/FSC configuration. This may be utilized to track, for example, high value items including laptops, personal effects, assets and so on. Persons may also be tracked in a similar manner.

A BNC/FSC enabled device 800(*a*) may possess the capability to communicate with a plurality of other BNC/FSC enabled devices 800(*b*), 800(*c*) and 800(*d*) within the vicinity. In this regard, a stolen laptop or tablet with BNC/FSC capability may be operable to send an alert or distress signal to any of a plurality of neighboring devices. The alert or distress signal may comprise a location of the devices. Accordingly, the stolen laptop or tablet may be traced and recovered using any of a plurality of location determining mechanisms such as relative position with respect to other devices with known locations, for example, access points (APs), RFID tags, and other BNC/FSC devices, with known location such as from an integrated GPS or location based on triangulation. A BNC/FSC enabled device may function as an indoor positioning device.

The exemplary steps start in step 804, where the BNC/FSC enabled device 800(*a*) may be operable to perform ranging to determine corresponding ranges of the BNC/FSC enabled device 800(*b*), and the one or more other BNC capable devices with known positions using BNC links with full spectrum capture. For example, parameters $r_{ab}$, $r_{ac}$, and $r_{ad}$ may represent the determined ranges for the BNC/FSC enabled devices 800(*b*), 800(*c*) and 800(*d*) with respect to the BNC/FSC enabled device 800(*a*), respectively.

In step 806, the BNC/FSC enabled device 800(*a*) may determine relative locations of the object (the BNC/FSC enabled device 800(*b*)) with respect to the known locations of the one or more other BNC/FSC enabled devices 800(*c*) and 800(*d*) utilizing BNC with full spectrum capture. In step 808, the BNC/FSC enabled device 800(*a*) may determine the location of the object (the BNC/FSC enabled device 800(*b*)) utilizing the determined ranges and the determined relative locations. In step 810, the BNC/FSC enabled device 800(*a*) may utilize the determined location of the object to support various use cases such as track the object (the BNC/FSC enabled device 800(*b*)) based on the determined location of the object.

In an exemplary embodiment of the invention, a BNC/FSC device may also tether itself to a fixed device such as a fixed access point and as a user of the BNC/FSC device walks through a mall or store, location may be determined. As soon as some distance is exceeded, then an alarm or alert may be initiated by an application running on a smartphone or tablet.

As the BNC/FSC device moves away and the tether is broken, a new tether maybe formed with another device. This may be utilized to track, for example, criminals, child molesters, and predators, as they move around. GPS or other GNSS technology may also be utilized to pinpoint location as movement is being tracked.

In an exemplary embodiment of the invention, an open tether may be utilized to enable in-building navigation of humans and/or objects. The speed and/or velocity of the BNC/FSC device may also be used to determine its location or relative location with respect to other devices. The Doppler from other surrounding sources may be utilized to determine the velocity.

A BNC/FSC device may operate as location aware and context aware device. In an exemplary embodiment of the invention, BNC/FSC devices may be operable to sense the environment. A map of BNC/FSC devices within a particular area may be generated and displayed. The map may be part of an application that is displayed on smartphones or tablets. For example, kids may view the map to determine which ones of their friends may be at the mall. A BNC/FSC device may be able to determine whether it is in a room, such as an office, as opposed to being in an auditorium. This information may be combined with GPS information to provide a more precise determination of the environment. The BNC/FSC device may be scaled based on the type of application and also based on the perimeter and surroundings where it is located.

In an exemplary embodiment of the invention, a file may be shared with conference participants in a conference room. The file may be opened and viewed by every participant in the room. However, if a participant leaves the conference room, then a lock is placed on the document and the document may no longer be viewed. If that participant re-enters the room, the document will again be viewable.

With a sufficiently high SNR, location may be resolved within a fraction of a wavelength, which translates to within a foot or less at 1 GHz.

In one embodiment of the invention, two BNC/FSC devices may be electronically tethered. The moment one of the devices moves out of a certain range of the other device, authentication or re-authentication may be required. The level of authentication required may vary depending of the distance of the two devices.

In an exemplary embodiment of the invention, user A is streaming a movie from their smartphone to a HD TV using BNC/FSC. User A's kids are currently watching this movie on the HD TV. User A gets up to take a call on the smartphone and starts moving away from the HD TV. As user A moves away from the HD TV, the bandwidth for the connection may decrease and the quality of the movie may start to deteriorate. User A may reach a point where a security issue arises because an unauthorized device may be able to pick up the streamed movie signal. When this occurs, the link may be dropped or user A may be requested to re-authenticate using a stronger key.

Wireless tethering may be provided for objects and/or persons. In this regard, BNC/FSC may enable the location of objects, animals and persons. For example, BNC/FSC may be utilized to determine whether a child is out of range without the need to measure and compare received signal strength. For devices, while they are tethered, there may be no need to authenticate. However, once the tether is broken, authentication may automatically be required.

In an exemplary embodiment of the invention, BNC/FSC devices may be used as a gaming controller since the resolution in position may be adjusted with fair accuracy. For example, three (3) BNC/FSC devices may be utilized and triangulation may be utilized to determine a position of a person or a body part such as a hand relative to the BNC/FSC devices. BNC/FSC sensors may also be place on the gamer's body to aid in more accurately determining the location of a person or the person's hand, for example.

Accelerometer and/or gyroscope information for devices may be shared among a plurality of BNC/FSC devices and utilized to assist with the gaming control or other interactive events. Limiting the number of participants to a communication session may provide additional security. For example, the number of participants may be limited to 5 and if a 6th person enters the room, connection is denied.

In various exemplary aspects of the method and system for broadband near-field communication utilizing full spectrum capture, a communication device such as the BNC/FSC enabled device 200 may comprise an integrated BNC/FSC transceiver 210 operating in a frequency spectrum band. The BNC/FSC enabled device 200 may be operable to detect usable channels within the entire frequency spectrum band. The BNC/FSC transceiver 210 may utilize one or more of the detected channels to wirelessly communicate multimedia content with one or more other BNC enabled devices such as the BNC/FSC enabled devices 110(a)-110(c). In an exemplary embodiment of the invention, the BNC/FSC enabled device 200 may be operable to pair with the BNC/FSC enabled devices 110(a)-110(c) utilizing BNC protocols. In this regard, the BNC/FSC transceiver 210 may be configured with various security levels during the pairing, as illustrated in FIG. 8. The security levels may be determined based on corresponding distances between the BNC/FSC transceiver 210 and the BNC/FSC enabled devices 110(a)-110(c). The BNC/FSC transceiver 210 may utilize the determined security levels to communicate the multimedia content with the BNC/FSC enabled devices 110(a)-110(c). Depending on device capabilities, the BNC/FSC enabled device 200 may support other wireless communication protocols such as Bluetooth, WiFi, ZigBee, and WiMAX. In some instances, the Bluetooth transceiver 220 may need to pair with other Bluetooth and BNC capable devices 110(a)-110(c), for example. In this regard, the BNC/FSC transceiver 210 may be enabled to exchange authentication information over an BNC link so as to expedite pairing the Bluetooth transceiver 220 with other Bluetooth and BNC capable devices 110(a)-110(c). After the BNC based pairing, the BNC/FSC enabled device 200 may utilize Bluetooth protocols via the Bluetooth transceiver 220 to communicate multimedia content with other Bluetooth and BNC capable devices 110(a)-110(c). In an exemplary embodiment of the invention, the BNC/FSC enabled device 200 may be configured to share the multimedia content with other BNC/FSC enabled devices 110(a)-110(c). For example, when a BNC/FSC device 110(a) is within certain proximity of the BNC/FSC device 200, the BNC/FSC device 200 may share its display with the BNC/FSC device 110(a) such that the two BNC/FSC enabled devices 200 and 110(a) may share and display the same multimedia content.

The BNC/FSC enabled devices 200 and 110(a)-110(c) may be configured to utilize full spectrum capture in order to detect usable channels and aggregate the usable channels to increase channel bandwidth for the data transmission. In one embodiment of the invention, for transmission, the data transmission may be carried or transmitted over a single detected channel within the operating frequency spectrum band. However, for reception, multiple reference elements or signals such as pilot signals may be utilized to determine or detect which of channels in the operating frequency spectrum band may be indeed usable.

In order to receive signals from the BNC/FSC enabled devices 110(a)-110(c), the BNC/FSC enabled device 200 may be operable to establish synchronization with the BNC/FSC enabled devices 110(a)-110(c). In this regard, the BNC/FSC enabled device 200 may be configured to utilize unlicensed bands to establish synchronization. In other words, synchronization information may also be provided in an unlicensed band, such as the cordless region 450, for example, between 917 MHz and 950 MHz. The BNC/FSC enabled device 200 may look into this region of the frequency spectrum band to find synchronization information.

In an exemplary embodiment of the invention, the BNC/FSC transceiver 210 may be utilized to provide a more precise location of an object such as the BNC/FSC enabled device 110(a). In this regard, the BNC/FSC transceiver 210 may perform ranging to determine corresponding ranges of the BNC/FSC enabled device 110(a), and the one or more other BNC capable devices with known positions such as the BNC/FSC enabled devices 110(b)-110(c) using BNC links with full spectrum capture. The BNC/FSC enabled device 200 may determine relative locations of the object (the BNC/FSC enabled device 110(a)) with respect to the known locations of the one or more other BNC/FSC enabled devices 110(b) and 110(c) utilizing BNC with full spectrum capture. The BNC/FSC enabled device 200 may determine the location of the object (the BNC/FSC enabled device 110(a)) utilizing the determined ranges and the determined relative locations.

In another exemplary embodiment of the invention, there is provided a communication device comprising an integrated broadband transceiver, wherein the integrated broadband transceiver is operable to communicate signals at a power level that is below a spurious emissions mask and to spread the communicated signals over a designated frequency spectrum band. The integrated broadband transceiver may be operable to detect usable channels within the designated frequency spectrum band. The detected usable channels may be aggregated and utilized for the communicating. The communication device comprising the integrated broadband transceiver may be viewed as a ultrawideband (UWB) system, without a carrier frequency, with the capability to go down to 0 Hz or DC, or substantially 0 Hz or DC. In other words, this may be viewed as a wireless receiver with no downconversion steps prior to analog-to-digital conversion. A minimum bandwidth may be established. For example, a minimum bandwidth such as approximately 500 MHz may be established. In another embodiment of the invention, the power divided by the bandwidth of the system may be, on average, below a particular limit.

The integrated broadband transceiver is operable to wirelessly communicate content with one or more other integrated broadband transceiver enabled devices over one or more of the detected channels. The one or more other integrated broadband transceiver enabled devices are operable to communicate signals at a power level that is below the spurious emissions mask and to spread the communicated signals over the entire designated frequency spectrum band.

The integrated broadband transceiver may be paired with the one or more other integrated broadband transceiver enabled devices utilizing one or more broadband near-field communication (BNC) protocols. The integrated broadband transceiver may be configured with security levels during the pairing. The security levels may be determined based on corresponding distances between the integrated broadband transceiver and the one or more other integrated broadband transceiver enabled devices.

The content may be communicated with the one or more other integrated broadband transceiver enabled devices based on the selected security levels utilizing the one or more BNC protocols. The content may also be communicated with the one or more other integrated broadband transceiver enabled devices based on the selected security levels utilizing one or more supported non-BNC protocols. The content may be shared with the one or more other integrated broadband transceiver enabled devices during the communicating.

The signals received from the one or more other integrated broadband transceiver enabled devices during the communicating may be synchronized. A range of the one or more other integrated broadband transceiver enabled devices may be determined utilizing the BNC protocols. A corresponding position of the one or more other broadband transceiver enabled devices may be identified based on the determined range.

Figure 9:
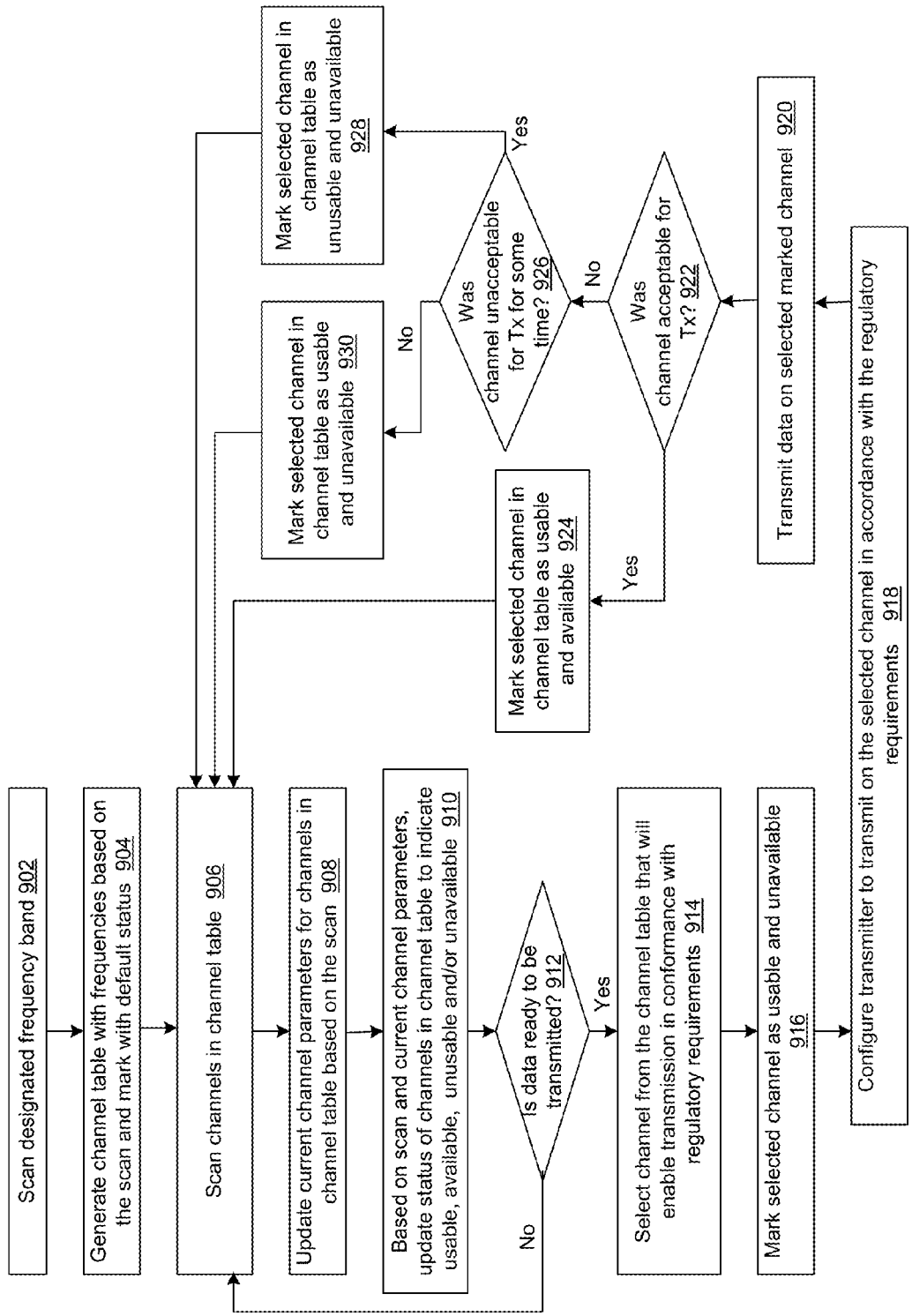
FIG. 9 is a flow chart illustrating exemplary steps for communicating utilizing Broadband Near Field Communication (BNC) with full spectrum capture (FSC), in accordance with an exemplary embodiment of the invention.

FIG. 9 is a flow chart illustrating exemplary steps for communicating utilizing Broadband Near Field Communication (BNC) with full spectrum capture (FSC), in accordance with an exemplary embodiment of the invention. Referring to FIG. 9, there is shown exemplary steps 902 through 930. In step 902, the BNC/FSC device may scan the designated frequency band. The entire designated frequency band may be scanned so that previously unused frequencies may be detected and deployed for broadband services with the use of full spectrum capture. In step 904, the BNC/FSC device may generate a channel table with channels based on the scan and mark each of the channels with a default status. In other words, the BNC/FSC device is operable to scan the designated frequency band and generate a channel table of the channels found in the designated frequency band. The channels in the channel table may be marked with a status such as usable, unusable, available and/or unavailable.

In step 906, the channels in the channel table may be scanned. In this regard, the channels in the channel table may be scanned to acquire one or more parameters such as SNR, BER, PER, received signal strength indicator (RSSI) in order to determined a current status of the channel. In step 908, the current parameters for the channels in the channel table may be updated based on the scanning, which is done in step 906. In step 910, based on the scan and the current channel parameters, the status of the channels in the channel table may be updated to indicate whether the channel is usable, available, unusable and/or unavailable.

In step 912, it may be determined whether data may be ready to be transmitted. If in step 912, data is not ready to be transmitted, then in step 912, the exemplary steps proceed to step 906, where the channels in the channel table are scanned. If in step 912, data is ready to be transmitted, then in step 914, a channel is selected that will enable transmission in conformance with regulatory requirements. In step 916, the status of the selected channel in the channel table may be marked as usable but unavailable. In step 918, the transmitter in the BNC/FSC device may be configured to transmit on the selected channel in accordance with the regulatory requirements.

In step 920, the BNC/FSC device may be operable to transmit data on the selected channel. For example, the transmitter in the BNC/FSC device may be operable to transmit the data as broadband signals that occupy, for example, a 800 MHz range of a frequency band of approximately 0 Hz to 1 GHz. The wireless broadband signals may be spread over, for example, a 300 MHz bandwidth of the 800 MHz range. In step 922, the BNC/FSC device may be operable to determine whether the channel was acceptable for transmission. For example, a receiver, which is paired with the BNC/FSC device and receives the transmitted broadband wireless signals, may be operable to feedback parameters of the received broadband wireless signal such as packet error rate (PER), bit error rate (BER), signal to noise ratio (SNR), signal to interference noise ratio (SINR), carrier to noise ratio (CNR), carrier to interference noise ratio (CINR) and received signal strength indication (RSSI).

If in step 922, the selected channel was acceptable for transmission, then in step 924, the selected channel is marked in the channel table as usable and available. Exemplary step 906 may be executed subsequent to step 924. If in step 922, the selected channel was not acceptable for transmission, then in step 926, the BNC/FSC device may be operable to determine whether the channel was unacceptable for transmission for some time. If in step 926, the channel was unacceptable for transmission for some time, then in step 928, the selected channel may be marked in the channel table as unusable and unavailable. Exemplary step 906 may be executed subsequent to step 928. If in step 926, the selected channel was not unacceptable, that is, the selected channel was acceptable, for transmission for some time, then in step 930, the selected channel may be marked in the channel table as usable and unavailable. Exemplary step 906 may be executed subsequent to step 930.

Figure 10:
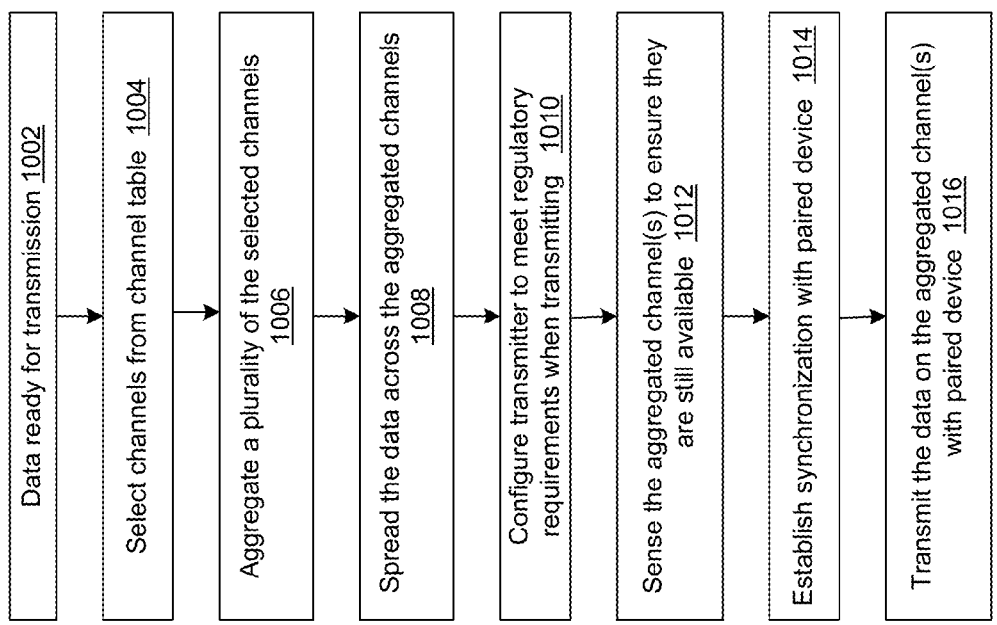
FIG. 10 is a flow chart illustrating exemplary steps for communicating data utilizing Broadband Near Field Communication (BNC) with full spectrum capture (FSC), in accordance with an exemplary embodiment of the invention.

FIG. 10 is a flow chart illustrating exemplary steps for communicating data utilizing Broadband Near Field Communication (BNC) with full spectrum capture (FSC), in accordance with an exemplary embodiment of the invention. Referring to FIG. 10, there is shown exemplary steps 1002 through 1016. In step 1002, data is ready for transmission by the BNC/FSC device. In step 1004, channels may be selected from the channel table. In step 1006, a plurality of selected channels may be aggregated. In step 1008, data may be spread across the aggregated channel(s). In step 1010, the transmitter in the BNC/FSC device may be configured to meet the regulatory requirements when transmitting. In step 1012, the transmitter in the BNC/FSC device may be operable to sense the aggregated channel to ensure they are still available. The sensing of the channel determines whether or not a channel is clear. If a channel is clear based on the sensing, then the channel may be utilized for transmission. In step 1014, the transmitter in the BNC/FSC device may establish synchronization with the paired device. In step 1016, the transmitter in the BNC/FSC device may transmit the data on the aggregated channel(s) to the paired device.

FIG. 11 is a flow chart illustrating exemplary steps for communicating data utilizing Broadband Near Field Communication (BNC) with full spectrum capture (FSC) using a pool of channels, in accordance with an exemplary embodiment of the invention. Referring to FIG. 11, there is shown exemplary steps 1102 through 1130. In step 1102, the designated frequency band may be scanned. In step 1104, a list of channels may be generated and placed in a channel table based on the scan. In step 1106, the channels listed in the channel table may be scanned and corresponding channel parameters such as BER, PER, SNR, SINR, and CINR may be acquired. In step 1108, the best channels may be selected from the list of channels in the channel table based on the channel parameters that were acquired during the scanning in step 1106. In step 1110, a plurality of the best channels may be selected and placed in pool of channels. In step 1112, channel parameters for the channels in the pool of channels may be dynamically updated.

In step 1114, the pool of channels may be shared with one or more paired devices that may be within operating range. Since the BNC/FSC device and the paired devices are in close proximity with each other, it may be assumed that the channel conditions experienced by the BNC/FSC device and the paired devices are substantially similar. Accordingly, the pool of channels may be shared with the paired device so that the paired device may utilize the channels in the pool of channels when communicating with the BNC/FSC device.

In step 1116, when data is ready to be transmitted, one or more channels may be allocated from the pool of channels. For example, the channels with the best channel parameters that will satisfy regulatory requirements may be selected.

In step 1118, a plurality of the allocated channels may be aggregated as needed to transmit the data. In step 1120, the transmitter (Tx) in the BNC/FSC device's front end may be configured to communicate in accordance with regulatory requirements. In step 1122, synchronization may be established with the paired device. In step 1124, the allocated one or more aggregated and/or non-aggregated channels may be sensed to determine whether they are clear and thus available for transmission. In step 1126, the transmitter in the BNC/FSC device may be operable to transmit the data on the one or more aggregated and/or non-aggregated channels. In step 1128, the one or more aggregated and/or non-aggregated channels may be de-allocated and returned to the pool of channels when transmission is completed.

Subsequent to step 1128, a plurality of different steps may occur. In an exemplary embodiment of the invention, subsequent to step 1128, it may be necessary to update the channels that are in the channel pools. In other words, one or more channels may be removed from the channel pool and/or one or more channels may be removed from the channel table. Accordingly, in step 1130, the channels listed in the channel table may be scanned and the channels in the channel pool may be updated if needed and the channels in the channel pool may also be updated. In another exemplary embodiment of the invention, subsequent to step 1128, it may be necessary to update the channel parameters for the channels in the channel pool. Accordingly, subsequent to step 1128, step 1112 may be executed, where the channel parameters for the channels in the channel pool may be updated. Other steps may be executed without departing from the spirit and scope of the invention.

Figure 12:
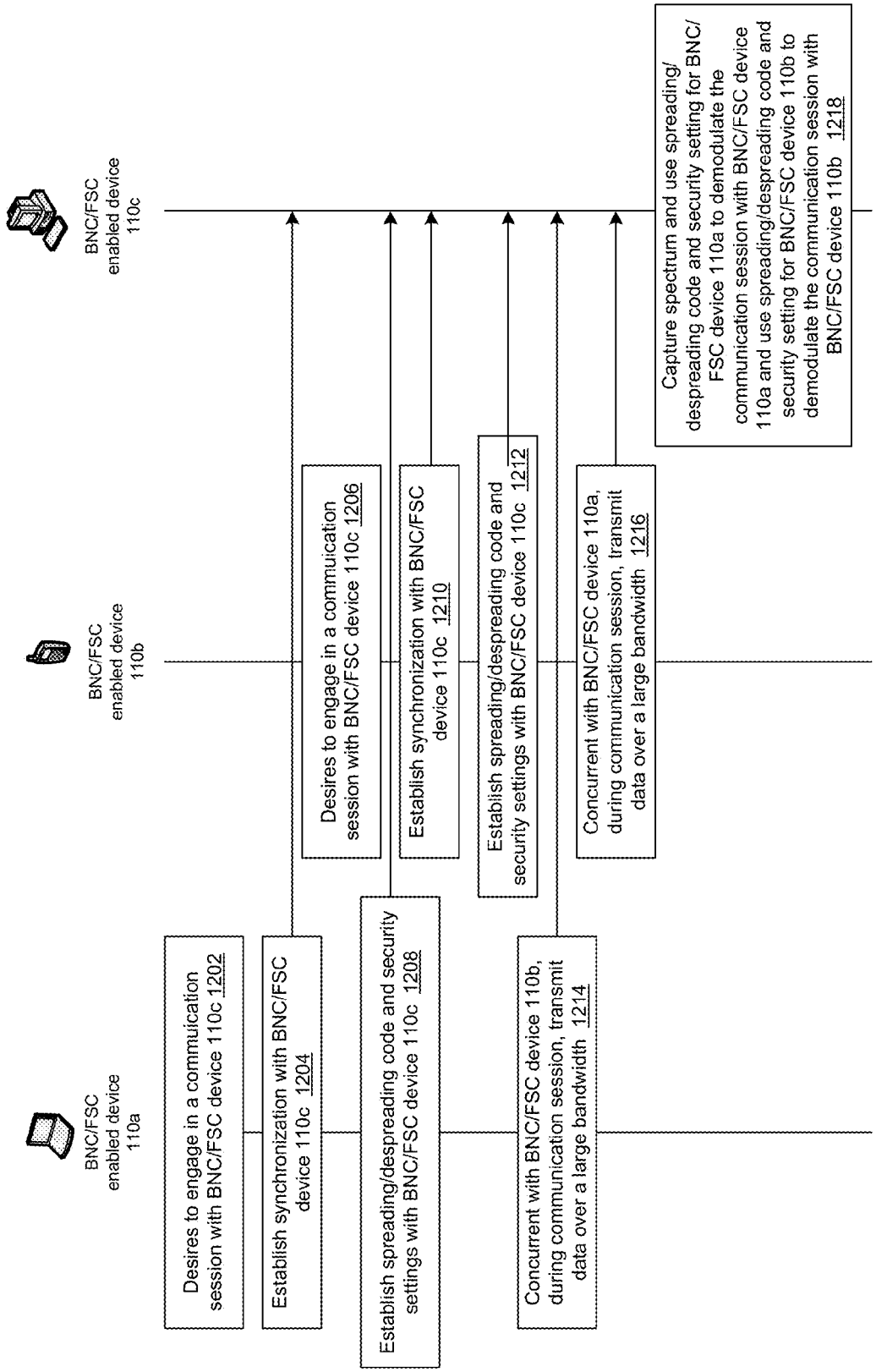
FIG. 12 is a flow diagram illustrating exemplary steps for concurrent communication of data among Broadband Near Field Communication (BNC) with full spectrum capture (FSC) devices, in accordance with an exemplary embodiment of the invention.

FIG. 12 is a flow diagram illustrating exemplary steps for concurrent communication of data among Broadband Near Field Communication (BNC) with full spectrum capture (FSC) devices, in accordance with an exemplary embodiment of the invention. Referring to FIG. 12, there is shown BNC/FSC devices 110a, 110b and 110c. In step 1202, the BNC/FSC device 110a, desires to engage in a communication session with BNC/FSC device 110c. In step 1204, the BNC/FSC device 110a establishes synchronization with the BNC/FSC device 110c. In step 1206, the BNC/FSC device 110b desires to engage in a communication session with BNC/FSC device 110c. In step 1208, the BNC/FSC device 110a establishes spreading/despreading code and security settings with the BNC/FSC device 110c. In step 1210, the BNC/FSC device 110b establishes synchronization with the BNC/FSC device 110c. In step 1212, the BNC/FSC device 110b establishes spreading/despreading code and security settings with the BNC/FSC device 110c.

In step 1214, concurrent with the BNC/FSC device 110b, during the communication session for the BNC/FSC device 110a and BNC/FSC device 110c, the BNC/FSC device 110a is operable to transmit data over a large bandwidth. In step 1216, concurrent with the BNC/FSC device 110a, during the communication session for the BNC/FSC device 110b and BNC/FSC device 110c, the BNC/FSC device 110b is operable to transmit data over a large bandwidth. In step 1218, the BNC/FSC device 110c is operable to capture the spectrum and use the spreading/despreading code and the security setting for the BNC/FSC device 110a to demodulate the communication session with BNC/FSC device 110*a* and use the spreading/despreading code and security setting for the BNC/FSC device 110*b* to demodulate the communication session with the BNC/FSC device 110*b*. It should be recognized that the order of the exemplary steps 1202 and 1218 as listed is not limited to the sequence in which they are presented. Accordingly, the steps may occur in one or more other orders without departing from the spirit and scope of the invention.

Figure 13:
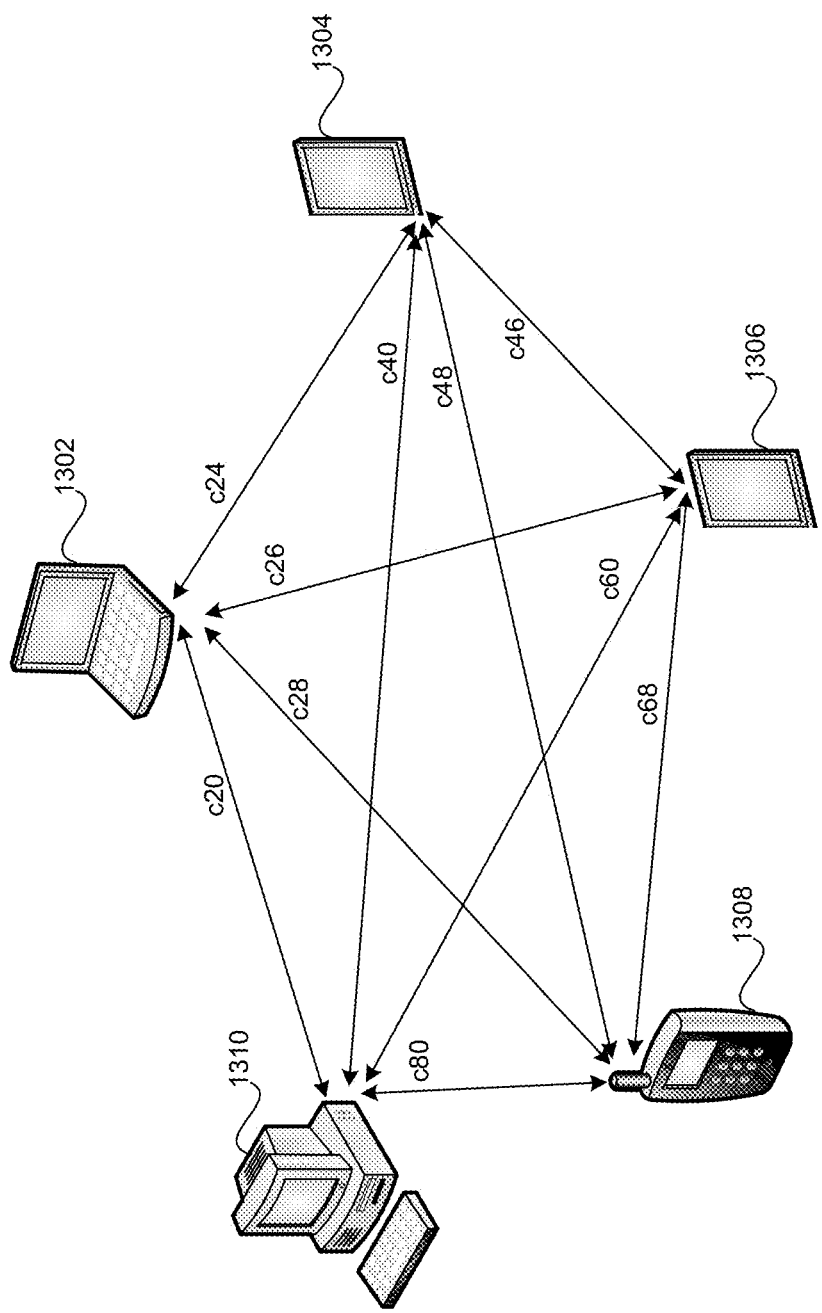
FIG. 13 is a diagram that illustrates exemplary ad-hoc communication between a plurality of Broadband Near Field Communication (BNC) with full spectrum capture (FSC) enabled devices, in accordance with an embodiment of the invention.

FIG. 13 is a diagram that illustrates exemplary ad-hoc communication between a plurality of Broadband Near Field Communication (BNC) with full spectrum capture (FSC) enabled devices, in accordance with an embodiment of the invention. Referring to FIG. 13, there is shown a plurality of BNC/FSC enabled devices 1302, 1304, 1306, 1308 and 1310. There is also shown a plurality of ad-hoc BNC/FSC communication links, namely, c24, c26, c28, c20, c46, c48, c40, c68, and c80, which may be established between each of the plurality of BNC/FSC enabled devices 1302, 1304, 1306, 1308 and 1310. In an exemplary embodiment, the BNC/FSC enabled device 1302 may comprise a laptop, the BNC/FSC enabled devices 1304 and 1306 may comprise a tablet, the BNC/FSC enabled device 1308 may comprise a smartphone and the BNC/FSC enabled device 1310 may comprise a personal computer. The BNC/FSC transceiver for the BNC/FSC enabled device 1310 may be a peripheral device that may be internally coupled within the BNC/FSC enabled device 1310, a peripheral device that may be externally coupled within the BNC/FSC enabled device 1310, and/or integrated device such as an integrated circuit (IC) or chip that may be integrated within the BNC/FSC enabled device 1310.

In an exemplary embodiment of the invention, the BNC/FSC enabled device 1302 may be operable to establish one or more ad-hoc BNC/FSC communication links, namely, c24 with the BNC/FSC enabled device 1304, c26 with the BNC/FSC enabled device 1306, c28 with the BNC/FSC enabled device 1308, and c20 with the BNC/FSC enabled device 1310. The ad-hoc BNC/FSC communication links c24, c26, c28 and c20 may be established at different times or they may be concurrently established.

In an exemplary embodiment of the invention, the BNC/FSC enabled device 1304 may be operable to establish one or more ad-hoc BNC/FSC communication links, namely, c24 with the BNC/FSC enabled device 1302, c46 with the BNC/FSC enabled device 1306, c48 with the BNC/FSC enabled device 1308, and c40 with the BNC/FSC enabled device 1310. The ad-hoc BNC/FSC communication links c24, c46, c48 and c40 may be established at different times or they may be concurrently established.

In an exemplary embodiment of the invention, the BNC/FSC enabled device 1306 may be operable to establish one or more ad-hoc BNC/FSC communication links, namely, c26 with the BNC/FSC enabled device 1302, c46 with the BNC/FSC enabled device 1304, c68 with the BNC/FSC enabled device 1308, and c60 with the BNC/FSC enabled device 1310. The ad-hoc BNC/FSC communication links c26, c46, c68 and c60 may be established at different times or they may be concurrently established.

In an exemplary embodiment of the invention, the BNC/FSC enabled device 1308 may be operable to establish one or more ad-hoc BNC/FSC communication links, namely, c28 with the BNC/FSC enabled device 1302, c48 with the BNC/FSC enabled device 1304, c68 with the BNC/FSC enabled device 1306, and c80 with the BNC/FSC enabled device 1310. The ad-hoc BNC/FSC communication links c28, c48, c68 and c80 may be established at different times or they may be concurrently established.

In an exemplary embodiment of the invention, the BNC/FSC enabled device 1310 may be operable to establish one or more ad-hoc BNC/FSC communication links, namely, c20 with the BNC/FSC enabled device 1302, c40 with the BNC/FSC enabled device 1304, c60 with the BNC/FSC enabled device 1306, and c80 with the BNC/FSC enabled device 1308. The ad-hoc BNC/FSC communication links c20, c40, c60 and c80 may be established at different times or they may be concurrently established.

Once the ad-hoc communication links c24, c26, c28, c20, c46, c48, c40, c68, and c80 are established, one or more of the ad-hoc communication links c24, c26, c28, c20, c46, c48, c40, c68, and c80 may be utilized to facilitate one or more BNC/FSC communication sessions. The communication sessions may be utilized to communicate content comprising text, voice, video and/or data. Since one or more of the BNC/FSC enabled devices may be mobile communication devices, an ad-hoc communication BNC/FSC link may be torn down and a new ad-hoc BNC/FSC communication link may be established when a BNC/FSC enabled device moves out of range of a first BNC/FSC enabled device and comes within range of a second BNC/FSC enabled device. The ad-hoc BNC/FSC communication links c24, c26, c28, c20, c46, c48, c40, c68, and c80 may comprise an ad-hoc BNC/FSC mesh network. Each of the presentation windows 1302*p* displayed on the home screen 1302*h*, the presentation windows 1304*p* displayed on the home screen 1304*h*, the presentation windows 1306*p* displayed on the home screen 1306*h*, and the presentation windows 1308*p* displayed on the home screen 1308*h* may be shared replicas of the presentation windows 1310*p* displayed on the home screen 1310*h*.

Figure 14:
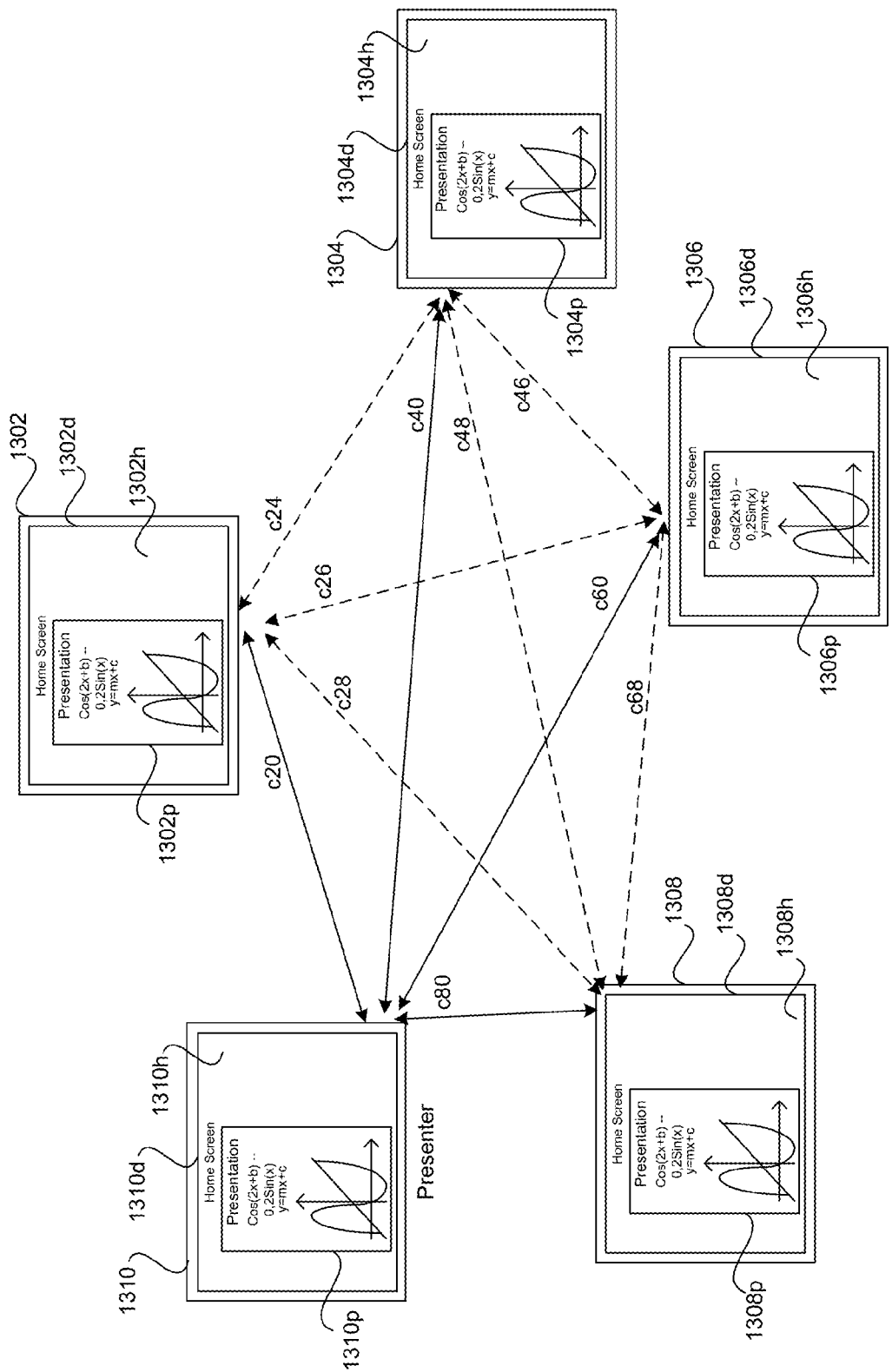
FIG. 14 is a diagram illustrating exemplary ad-hoc sharing of screen content utilizing Broadband Near Field Communication (BNC) with full spectrum capture (FSC), in accordance with an embodiment of the invention.

FIG. 14 is a diagram illustrating exemplary ad-hoc sharing of screen content utilizing Broadband Near Field Communication (BNC) with full spectrum capture (FSC), in accordance with an embodiment of the invention. Referring to FIG. 14, there is shown the exemplary BNC/FSC enabled devices 1302, 1304, 1306 1308 and 1310 of FIG. 13. The devices 1302, 1304, 1306, 1308 and 1310 may be located in, for example, a conference room. With regard to the BNC/FSC enabled device 1302, there is shown a display 1302*d*, a home screen 1302*h* displayed on the display 1302*d*, and a presentation window 1302*p* displayed on the home screen 1302*h*. With regard to the BNC/FSC enabled device 1304, there is shown a display 1304*d*, a home screen 1304*h* displayed on the display 1304*d*, and a presentation window 1304*p* displayed on the home screen 1304*h*. With regard to the BNC/FSC enabled device 1306, there is shown a display 1306*d*, a home screen 1306*h* displayed on the display 1306*d*, and a presentation window 1306*p* displayed on the home screen 1306*h*. With regard to the BNC/FSC enabled device 1308, there is shown a display 1308*d*, a home screen 1308*h* displayed on the display 1308*d*, and a presentation window 1308*p* displayed on the home screen 1308*h*. With regard to the BNC/FSC enabled device 1310, there is shown a display 1310*d*, a home screen 1310*h* displayed on the display 1310*d*, and a presentation window 1310*p* displayed on the home screen 1310*h*.

In accordance with various embodiments of the invention, one or more of the BNC/FSC enabled device 1302, 1304, 1306, 1308 and 1310 may be operable to share the content on their display or screen with one or more others of the BNC/FSC enabled device 1302, 1304, 1306, 1308 and 1310 utilizing one or more corresponding ones of the plurality of ad-hoc BNC/FSC communication links c24, c26, c28, c20, c46, c48, c40, c68, and c80. For example, a conference presenter may utilize one or more of the BNC/FSC enabled device 1302, 1304, 1306, 1308 and 1310 to share the conference presentation materials displayed on their tablet screen or smartphone screen with one or more team members in a conference room, either directly or in a daisy-chain manner. In this regard, the content displayed on the presenter's tablet screen or smartphone screen may be displayed on the screens of team members in an ad-hoc manner utilizing one or more of the ad-hoc BNC/FSC communication links c24, c26, c28, c20, c46, c48, c40, c68, and c80.

With reference to FIG. 14, the BNC/FSC enabled device 1310 may operate as a presentation device that may be utilized by a presenter of the conference. In this regard, the BNC/FSC enabled device 1310 may be operable to share its home screen 1310h, which displays the presentation 1310p, with the BNC/FSC enabled devices 1302, 1304, 1306 and 1308 via the ad-hoc BNC/FSC communication links (illustrated as solid lines) c20, c40, c60, c80, respectively. The presenter may also be operable to interact with the content on the displays 1302d, 1304d, 1306d and 1308d. In one aspect of the invention, the presenter may be operable to concurrently interact with the content on the displays 1302d, 1304d, 1306d and 1308d. In another embodiment of the invention, the presenter may be operable to interact with a one or more selected ones of the displays 1302d, 1304d, 1306d and 1308d. For example, in instances where the presenter may explain an idea to only the participants utilizing the BNC/FSC enabled devices 1302 and 1306, the presenter may be enable to interact with the displays 1302d and 1306d, respectively, without causing this interaction to appear on the remaining displays 1304d and 1308d.

The remaining ad-hoc BNC/FSC communication links c24, c26, c28, c46, c48, c68, which are illustrated as dotted lines) are not being utilized for sharing of the presentation. Accordingly, the remaining ad-hoc BNC/FSC communication links c24, c26, c28, c46, c48, c68 may be established and utilized as needed for other ad-hoc BNC/FSC communication among the corresponding BNC/FSC devices that are coupled via these ad-hoc BNC/FSC communication links. For example, the BNC-FSC enabled device 1302 may share its screen and/or other content with the BNC/FSC enabled devices 1304 and 1306 via the ad-hoc BNC/FSC communication links c24 and c26, respectively.

In another aspect of the invention, one or more of the BNC/FSC enabled devices 1302, 1304, 1306 and 1308 may also be operable to share their corresponding displays and/or interact with the presenter, who is utilizing the BNC/FSC enabled device 1310, via the ad-hoc BNC/FSC communication links c20, c40, c60, c80, respectively. In this regard, there may be bi-directional sharing or displays and/or interactions between the BNC/FSC enabled device 1310 and one or more of the BNC/FSC enabled devices 1302, 1304, 1306 and 1308.

In another aspect of the invention, the presenter may authorize one or more of the BNC/FSC enabled devices 1302, 1304, 1306 and 1308 to take control of the presentation. In this regard, one or more of the BNC/FSC enabled devices 1302, 1304, 1306 and 1308 may be enabled to function as a presenter. It should be recognized that the sharing and interactions are not limited to presentations or conferences. Accordingly, other content, and/or interaction among a plurality of the BNC/FSC enabled devices 1302, 1304, 1306, 1308 and 1310 may occur. For example, user of the BNC/FSC enabled device 1306 may need assistance with configuring an application that may be running on the BNC/FSC enabled device 1304. In this regard, the ad-hoc BNC/FSC communication link c46 may be established between the BNC/FSC enabled device 1304 and the BNC/FSC enabled device 1306. A user of the BNC/FSC enabled device 1306 may then access the application settings on the BNC/FSC enabled device 1304 and configure the settings for the user of the BNC/FSC enabled device 1304.

While applications such as WebEx and other conference applications are tied to the Web and for example, a conference server, various embodiments of the instant invention comprise ad-hoc sharing of content, and control and manipulation of content displayed on a screen. In this regard, there is no need for a sophisticated backend server to facilitate the Web sharing service.

In an exemplary embodiment of the invention, a user of one of the BNC/FSC enabled devices 1302, 1304, 1306, 1308 and 1310 may decide to take a picture and instead of showing it to a friend and emailing or texting the picture to that friend, the user may decide to share the screen that displays the picture content. Unlike Webex or other screen sharing methods, the BNC/FSC enabled devices may be operable to utilize BNC/FSC to share screens on, for example, a smartphone or tablet without using a cellular (e.g. 3G/4G) network, Wi-Fi or the Internet. Additionally, no wires need to be connected for sharing and/or interacting with content among devices. For example, a user of the BNC/FSC enabled device 1308 may take a picture and want to share the picture with a user of the BNC/FSC enabled device 1304. In this regard, the ad-hoc BNC/FSC communication link c48 BNC/FSC enabled device 1308 may be established between the BNC/FSC enabled device 1308 and the BNC/FSC enabled device 1304. The use of the BNC/FSC enabled device 1308 may then share the picture with the user of the BNC/FSC enabled device 1308 without utilizing a cellular link.

Figure 15:
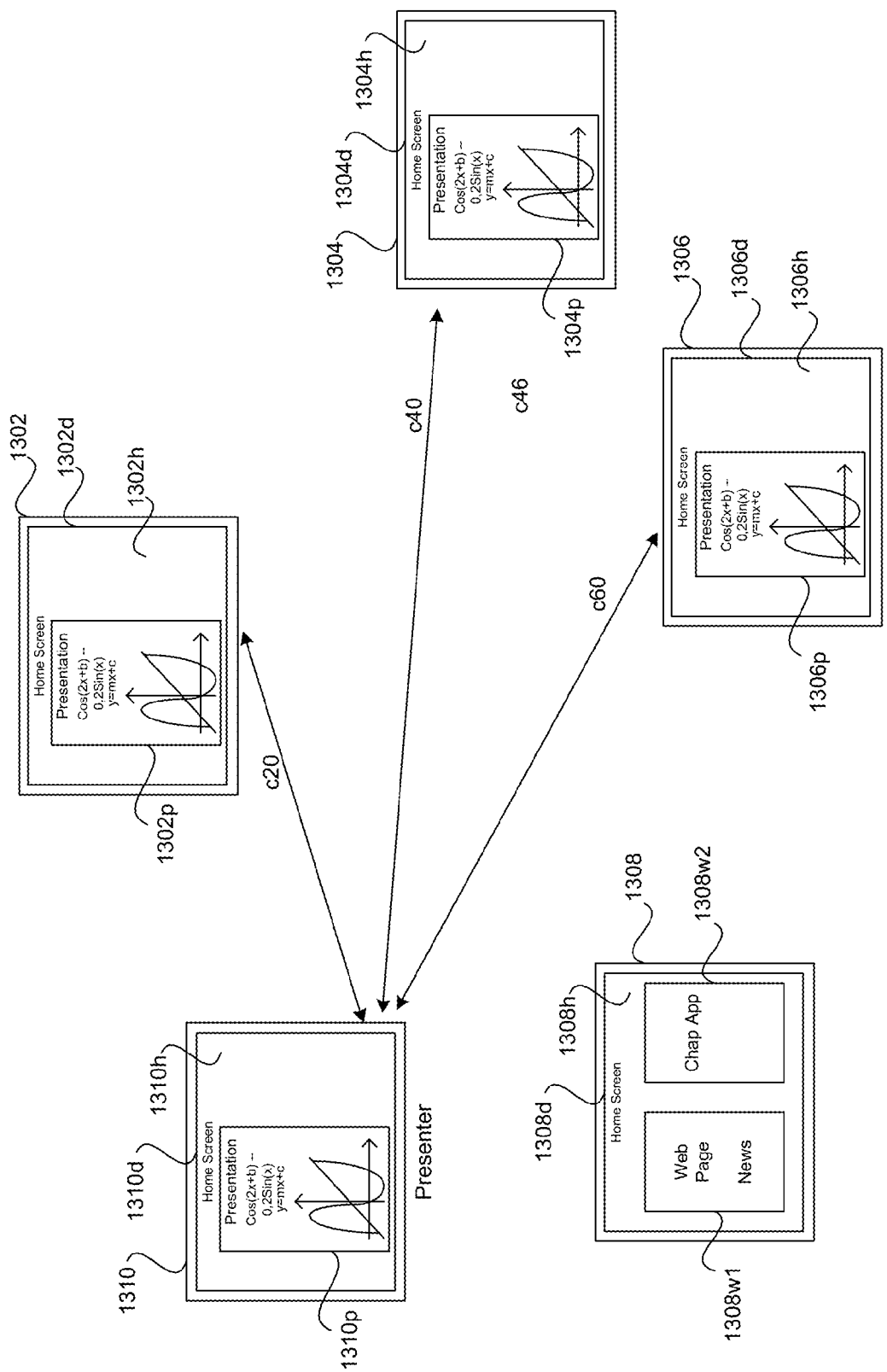
FIG. 15 is a diagram illustrating exemplary ad-hoc sharing of screen content utilizing Broadband Near Field Communication (BNC) with full spectrum capture (FSC), in accordance with an embodiment of the invention.

FIG. 15 is a diagram illustrating exemplary ad-hoc sharing of screen content utilizing Broadband Near Field Communication (BNC) with full spectrum capture (FSC), in accordance with an embodiment of the invention. Referring to FIG. 15, there is shown the exemplary BNC/FSC enabled devices 1302, 1304, 1306, 1308 and 1310 of FIGS. 13 and 14. FIG. 15 also shows the ad-hoc BNC/FSC communication links c20, c40 and c60. The BNC/FSC enabled devices 1302, 1304, 1306 and 1310 may be located in, for example, a conference room. The BNC/FSC enabled devices 1302, 1304, 1306 and 1310 may be participating in a conference where materials may be electronically presented. The BNC/FSC enabled device 1308 may be located inside the conference room but may not be participating in the conference with the other BNC/FSC enabled devices 1302, 1304, 1306 and 1310.

FIG. 15 is substantially similar to FIG. 14 for the BNC/FSC enabled devices 1302, 1304, 1306 and 1310. In this regard, with respect to the BNC/FSC enabled device 1302, there is shown a display 1302d, a home screen 1302h displayed on the display 1302d, and a presentation window 1302p displayed on the home screen 1302h. With regard to the BNC/FSC enabled device 1304, there is shown a display 1304d, a home screen 1304h displayed on the display 1304d, and a presentation window 1304p displayed on the home screen 1304h. With regard to the BNC/FSC enabled device 1306, there is shown a display 1306d, a home screen 1306h displayed on the display 1306d, and a presentation window 1306p displayed on the home screen 1306h. With regard to the BNC/FSC enabled device 1308, there is shown a display 1308d, a home screen 1308h displayed on the display 1308d, a Web browser window displaying a Web page 1308w1, and a chat application (app) 1308w2. The chat app 1308w2 may be a standalone app or a web-based app. With regard to the BNC/FSC enabled device 1310, there is shown a display 1310d, a home screen 1310h displayed on the display 1310d, and a presentation window 1310p displayed on the home screen 1310h.

In accordance with various embodiments of the invention, one or more of the BNC/FSC enabled device 1302, 1304, 1306, 1308 and 1310 may be operable to share the presentation materials content on their display or screen and enable user interaction with one or more others of the BNC/FSC enabled device 1302, 1304, 1306, 1308 and 1310 utilizing one or more corresponding ones of the plurality of ad-hoc BNC/FSC communication links c20, c40 and c60. For example, the conference presenter may utilize the BNC/FSC enabled device 1310 to share the conference presentation 1310*p* with one or more of the BNC/FSC enabled device 1302, 1304, and 1306, via the ad-hoc BNC/FSC communication links c20, c40 and c60, respectively. Bi-directional communication may occur between the BNC/FSC enabled device 1302, 1304, 1306, and 1310 via the ad-hoc BNC/FSC communication links c20, c40 and c60.

Figure 16:
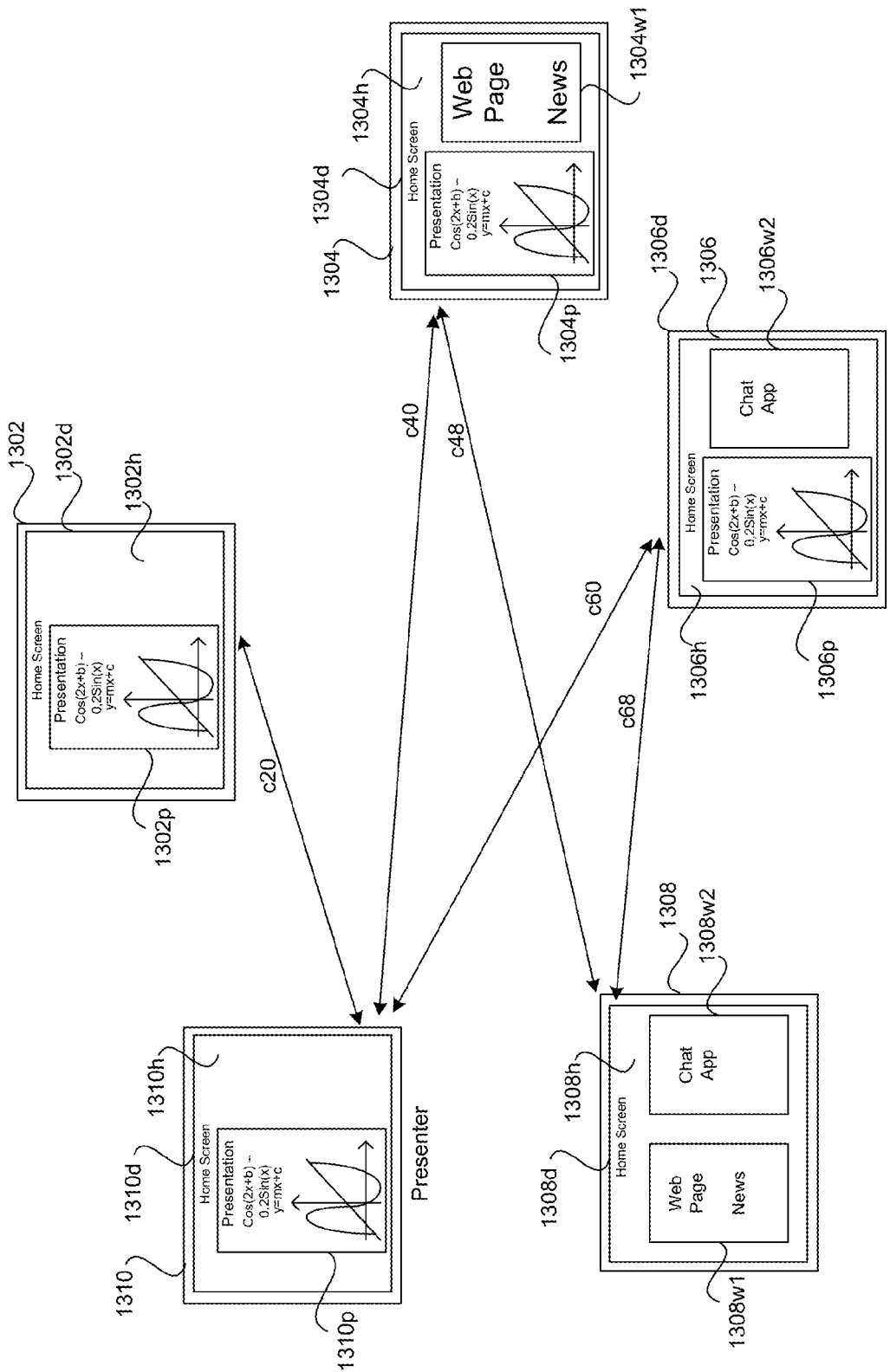
FIG. 16 is a diagram illustrating exemplary ad-hoc sharing of screen content utilizing Broadband Near Field Communication (BNC) with full spectrum capture (FSC), in accordance with an embodiment of the invention.

FIG. 16 is a diagram illustrating exemplary ad-hoc sharing of screen content utilizing Broadband Near Field Communication (BNC) with full spectrum capture (FSC), in accordance with an embodiment of the invention. Referring to FIG. 16, there is shown the exemplary BNC/FSC enabled devices 1302, 1304, 1306 and 1308 and 1310 of FIGS. 13, 14 and 15. FIG. 15 also shows the ad-hoc BNC/FSC communication links c20, c40, c60, c48 and c68. The BNC/FSC enabled devices 1302, 1304, 1306 and 1310 may be located in, for example, a conference room. The BNC/FSC enabled devices 1302, 1304, 1306 and 1310 may be participating in, for example, a conference where materials are being electronically presented. The BNC/FSC enabled device 1308 may be outside the conference room and may not be participating in the conference.

FIG. 16 is substantially similar to FIGS. 14 and 15 for the BNC/FSC enabled devices 1302, 1306 and 1310. In this regard, with respect to the BNC/FSC enabled device 1302, there is shown a display 1302*d*, a home screen 1302*h* displayed on the display 1302*d*, and a presentation window 1302*p* displayed on the home screen 1302*h*. With regard to the BNC/FSC enabled device 1304, there is shown a display 1304*d*, a home screen 1304*h* displayed on the display 1304*d*, a presentation window 1304*p* displayed on the home screen 1304*h*, and a Web browser window displaying a Web page 1304*w*1. With regard to the BNC/FSC enabled device 1306, there is shown a display 1306*d*, a home screen 1306*h* displayed on the display 1306*d*, and a presentation window 1306*p* displayed on the home screen 1306*h*. With regard to the BNC/FSC enabled device 1308, there is shown a display 1308*d*, a home screen 1308*h* displayed on the display 1308*d*, a Web browser window displaying a Web page 1308*w*1, and a chat application (app) 1308*w*2. The chat app 1308*w*2 may be a standalone app or a web-based app. With regard to the BNC/FSC enabled device 1310, there is shown a display 1310*d*, a home screen 1310*h* displayed on the display 1310*d*, and a presentation window 1310*p* displayed on the home screen 1310*h*.

With reference to FIG. 16, similar to what is described with respect to FIG. 15, the conference presenter may utilize the BNC/FSC enabled device 1310 to share the conference presentation 1310*p* with one or more of the BNC/FSC enabled device 1302, 1304, and 1306, via the ad-hoc BNC/FSC communication links c20, c40 and c60, respectively. Bi-directional communication may occur between the BNC/FSC enabled device 1302, 1304, 1306, and 1310 via the ad-hoc BNC/FSC communication links c20, c40 and c60. Accordingly, the displays of one or more of the BNC/FSC enabled device 1302, 1304, 1306, and 1310 may be operable to display the shared presentation material content and enable user interaction amongst the BNC/FSC enabled devices 1302, 1304, 1306, and 1310 via one or more corresponding ones of the plurality of ad-hoc BNC/FSC communication links c20, c40 and c60.

In another aspect of the invention, concurrent with the conference presentation and the sharing of display content amongst the BNC/FSC enabled devices 1302, 1304, 1306, and 1310 via one or more corresponding ones of the plurality of ad-hoc BNC/FSC communication links c20, c40 and c60, the BNC/FSC enabled device 1308 may communicate with the BNC/FSC enabled devices 1304 and 1306. In this regard, the BNC/FSC enabled device 1308 may be operable to establish corresponding ad-hoc BNC/FSC communication links c48 and c68 to communicate with the BNC/FSC enabled devices 1304 and 1306, respectively. Once the ad-hoc BNC/FSC communication links c48 and c68 have been established between the BNC/FSC enabled device 1304 and the BNC/FSC enabled device 1306, respectively, the BNC/FSC enabled device 1308 may be operable to share content and/or application with the BNC/FSC enabled device 1304 and 1306, respectively. In this regard, the user of the BNC/FSC enabled device 1308 may share a currently viewed web-browsing screen with a user of the BNC/FSC enabled device 1306.

The BNC/FSC enabled device 1308 may be operable to concurrently share the Web browser window displaying the Web page 1308*w*1, with the BNC/FSC enabled device 1304. In this regard, the Web page 1304*w*1, which is displayed on the home screen 1304*h* of the display 1304*d*, is a replica of the Web page 1308*w*1, which is displayed on the home screen 1308*h* of the display 1308*d*.

The BNC/FSC enabled device 1308 may also be operable to concurrently share the chat application (app) 1308*w*2, with the BNC/FSC enabled device 1306. In this regard, the chat application (app) 1306*w*2, which is displayed on the home screen 1306*h* of the display 1306*d*, is a replica of the chat application (app) 1308*w*2, which is displayed on the home screen 1308*h* of the display 1308*d*. In this regard, the user of the BNC/FSC enabled device 1308 may share a current conversation, which is being conducted with a $3^{rd}$ party, with a user of the BNC/FSC enabled device 1306.

In an exemplary embodiment of the invention, BNC/FSC enabled devices 1302, 1304, 1306, 1308, and 1310 may be operable to manage the interaction, sharing of screens and/or content utilizing a layered approach. Accordingly, in instances when a BNC/FSC enabled device comes within certain proximity of another BNC/FSC enabled device and establishes an ad-hoc communication link, the displays may be shared and/or interaction may occur without the need for any security. In this regard, either of the BNC/FSC enabled devices may concurrently display the same content or a portion of the display of one of the BNC/FSC enabled device may be shared with the other BNC/FSC enabled device. One or more of the BNC/FSC enabled devices may utilize a profile that may determine a manner in which content and/or applications may be shared, interaction may occur, and with whom the content and/or application should be shared and when. The profile may also comprise information that may specify a manner in which interaction may occur and with whom and what time the interaction should occur. Some of the settings in the profile may be dynamic and others may be static. The profile may also be utilized to indicate other criteria such as time of day and location where sharing of the screen is permissible. Once the profile or some default settings are established, then the sharing of the display may occur automatically without user intervention.

In instances, one or more of the BNC/FSC enabled devices 1302, 1304, 1306, 1308, and 1310 may be a location aware and/or context aware BNC/FSC enabled device. In this regard, a location aware and/or context aware BNC/FSC enabled device may be configured to determine whether the environment is a friendly one and if so, no security may be utilized. On the other hand, if it determined that the environment is unfriendly, then security may be required before screens, application and/or content may be shared, and/or interaction may be permitted. A friendly environment is one in which a high confidence is given or attaches to the BNC/FSC enabled devices that may be within a certain range and may be deemed a trusted device. If the user is with family or close friends, then such an environment may be deemed a friendly environment and interaction may be permitted, and/or the screen, applications and/or content may be shared without security with devices that are within a certain range via one or more ad-hoc BNC/FSC communication links. For devices outside of that range, then such an environment may be deemed an unfriendly environment and security may be required for interaction, and/or security may be required in order to share the screen, applications and/or content.

A secure BNC/FSC communication link may be established between a plurality of BNC/FSC enabled devices and a secure communication session may be initiated between two or more of the BNC/FSC enabled devices with the proper security keys (public keys and private keys) and/or security procedures in place. A user of a BNC/FSC enabled device may initiate sharing of their BNC/FSC enabled device screen, content and/or application with all devices within a certain range, for example, 10 feet without security. This may occur since there is enough bandwidth to resolve the distance to within a few inches or less. The distance may be extended in instances where the user thinks that only trusted devices will be within that extended range. In some instances, the user may only allow a certain number of BNC/FSC enabled devices to share the screen, content and/or application. Once that number is reached, then no more connections or sharing sessions are permitted. If another device attempts to view the displayed screen, then that attempt may be denied. This may be referred to as proximity sharing. With proximity sharing, a BNC/FSC enabled device may or may not be operable to place one or more restrictions on whether the screen, application, content and/or files may be copied and/or edited. For example, in instances where a file of a memo is being shared amongst a plurality of BNC/FSC enabled communication devices, group editing may be enabled for some or all of the members in the group. Members in the group may be given control of the document at different times to enable editing. For example, the members may be passed a token to enable editing. In this regard, possession of the token enables editing and if a member is not in possession of the token, then a member is not able to edit the document. This may also be utilized in, for example, a social environment. For example, one user of a BNC/FSC enabled device may draw on their device screen and the drawing on that screen may be shared among friends in a room via one or more ad-hoc BNC/FSC communication links. The friends may interact with the drawing and may edit the document so it becomes a conversational piece.

The BNC/FSC enabled devices may be operable to establish one or more ad-hoc communication links that may allow communication and sharing of content, applications and displays without the need to use WWAN networks, WLAN networks, or WPAN network thereby eliminating the need to utilize and cause congestion on these networks. The cellular service providers may embrace this since it may offload traffic from their networks. This autonomous sharing requires no configuration on the part of the users.

FIG. 17 is a flow chart illustrating exemplary steps for providing screen and application utilizing Broadband Near Field Communication (BNC) with full spectrum capture (FSC), in accordance with an embodiment of the invention. Referring to FIG. 17, there is shown exemplary steps 1702 through 1708. In step 1702, a BNC/FSC enabled device may be operable to determine whether the BNC/FSC enabled devices are within operating range. In step 1704, the BNC/FSC enabled device may establish ad-hoc wireless communication with the BNC/FSC enabled devices that are within operating range. In step 1706, the BNC/FSC enabled device may be operable to determine whether to utilize security for the communication sessions over the established ad-hoc wireless communication links. In step 1708, the BNC/FSC enabled device may share display, content and/or application and enable interaction on the shared displays in accordance with the security requirements.

In accordance with various embodiments of the invention, a wireless communication device 1310 establishes one or more ad-hoc communication links c20, c40, c60 with one or more corresponding other wireless communication devices 1302, 1304, 1306, 1308 within operating range. A replica of at least a portion of a display 1310d of the wireless communication device 1310 may be shared with the corresponding other wireless communication devices 1302, 1304, 1306, 1308 utilizing wireless broadband signals that are communicated via the established one or more ad-hoc communication links c20, c40, c60, c80, respectively. The wireless communication device 1310 and the other wireless communication devices 1302, 1304, 1306, and 1308 are operable to communicate the wireless broadband signals at a power level that is below a spurious emissions mask. The transmitted wireless broadband signals may occupy a designated frequency spectrum band. The wireless broadband signals may be spread across the entire designated frequency spectrum band such that a bandwidth of the wireless broadband signals occupy approximately 800 MHz within a range of 0 Hz to 1 GHz. A corresponding transmit power utilized for transmitting the wireless broadband signals may be spread over a bandwidth of approximately 300 MHz within the 800 MHz bandwidth such that the spreading results in a power spectral density of the transmitted wireless broadband signals approximating thermal noise at a distance of approximately 3 meters.

The shared replica 1302p, 1304p, 1306p, 1308p of at least a portion of the display 1310d of the wireless communication device 1310 includes one or more applications, text, video and/or data content. A user of the wireless communication device 1310 may interact with content that is displayed on a display 1302d, 1304d, 1306d and 1308d of the corresponding other wireless communication devices 1302, 1304, 1306, 1308, respectively, and vice-versa. The wireless communication device 1310 may be operable to determine whether to utilize security for the sharing and/or the interaction based on proximity of the wireless communication device 1310 to the corresponding other wireless communication devices 1302, 1304, 1306, 1308 and/or based on corresponding profiles of the wireless communication device 1310 or the corresponding other wireless communication devices 1302, 1304, 1306, 1308.

A first of the one or more corresponding other wireless communication devices 1308 may be operable to establish a new ad-hoc communication link c68 with a new wireless communication device 1306. The new wireless communication device 1306 is operable to communicate with the first of the one or more corresponding other wireless communication devices 1308 utilizing the wireless broadband signals which may be communicated via the established new ad-hoc communication link c68. The first of the one or more corresponding other wireless communication devices 1308 may be operable to share a replica 1308w2 of at least a portion of a display 1308d of the first of the one or more corresponding other wireless communication devices 1308 with the new wireless communication device 1306 via the established new ad-hoc communication link c68. The sharing of the replica of at least a portion of the display 1310d of the wireless communication device 1310 and the sharing by the first of the one or more corresponding other wireless communication devices 1308 may occur concurrently. The established one or more ad-hoc communication links may comprise bi-directional communication links.

As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Although this disclosure makes various references to BNC and near-field communications in general, in some implementations communications described above as using near-field communications may also or alternatively use transition zone (distances between near field and far field) communications and/or far-field communications. Accordingly, aspects of the present invention, including various devices, protocols, and systems described herein using "BNC" or "near-field" modifiers, should be considered as disclosing corresponding transition zone and fair-field devices, protocols, and systems. Therefore, a claim term should not be construed as being necessarily limited by the terms "BNC" or "near-field" unless such modifiers are explicitly recited in the claim with respect to such claim term.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for broadband near-field communication utilizing full spectrum capture supporting screen and application sharing.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
   in a first wireless communication device:
      establishing an ad-hoc communication link with a second wireless communication device within operating range, wherein said establishing said ad-hoc communication link comprises:
         determining, based on strength of wireless broadband signals received by said first wireless communication device from said second wireless communication device, a distance between said first wireless communication device and said second wireless communication device;
         exchanging security information if said determined distance between said first wireless communication device and said second wireless communication device is above a first threshold; and
         bypassing an exchange of said security information if said determined distance between said first wireless communication device and said second wireless communication device is below said first threshold; and
      sharing a replica of at least a portion of a display of said first wireless communication device with said second wireless communication device utilizing said wireless broadband signals that are communicated via said established ad-hoc communication link.

2. The method according to claim 1, wherein said shared replica of said at least a portion of said display of said first wireless communication device comprises one or more applications, text, video and/or data content.

3. The method according to claim 1, comprising interacting with content that is displayed on a display of said second wireless communication device.

4. The method according to claim 3, determining whether to utilize security for one or both of said sharing and/or said interaction.

5. The method according to claim 3, wherein said security is based on one or both of proximity of said first wireless communication device to said second wireless communication device and/or one or more corresponding profiles associated with said first wireless communication device and said second wireless communication device.

6. The method according to claim 1, wherein:
   said second wireless communication device establishes a new ad-hoc communication link with a third wireless communication device.

7. The method according to claim 6, wherein said second wireless communication device shares a replica of at least a portion of a display of said second wireless communication device with said third wireless communication device via said established new ad-hoc communication link.

8. The method according to claim 7 wherein said sharing of said replica of said at least said portion of said display of said first wireless communication device and said sharing by said second wireless communication device occurs concurrently.

9. The method according to claim 1, wherein said threshold corresponds to physical contact between said first wireless communication device and said second wireless communication device.

10. The method according to claim 1, wherein:
said security information is information corresponds to a first level of security if said determined distance is above said first threshold and below a second threshold; and
said security information is information corresponds to a second level of security if said determined distance is above said first threshold and above said second threshold.

11. A system, comprising:
one or more circuits for use in a first wireless communication device, said first wireless communication device being operable to:
establish an ad-hoc communication link with a second wireless communication device within operating range, wherein said establishment of said ad-hoc communication link comprises:
determination, based on strength of wireless broadband signals received by said first wireless communication device from said second wireless communication device, of a distance between said first wireless communication device and said second wireless communication device;
exchange of security information if said determined distance between said first wireless communication device and said second wireless communication device is above a first threshold; and
bypass of an exchange of said security information if said determined distance between said first wireless communication device and said second wireless communication device is below said first threshold; and
share a replica of at least a portion of a display of said first wireless communication device with said second wireless communication device utilizing wireless broadband signals that are communicated via said established ad-hoc communication link.

12. The system according to claim 11, wherein said shared replica of said at least a portion of said display of said first wireless communication device comprises one or more applications, text, video and/or data content.

13. The system according to claim 11, wherein said one or more circuits are operable to enable interaction with content that is displayed on a display of said second wireless communication device.

14. The system according to claim 13, wherein said one or more circuits are operable to determine whether to utilize security for one or both of said sharing and/or said interaction.

15. The system according to claim 13, wherein said security is based on one or both of proximity of said first wireless communication device to said second wireless communication device and/or one or more corresponding profiles associated with said first wireless communication device and said second wireless communication device.

16. The system according to claim 11, wherein:
said second wireless communication device establishes a new ad-hoc communication link with a third wireless communication device.

17. The system according to claim 16, wherein said second wireless communication device shares a replica of at least a portion of a display of said second wireless communication device with said third wireless communication device via said established new ad-hoc communication link.

18. The system according to claim 17 wherein said sharing of said replica of said at least said portion of said display of said first wireless communication device and said sharing by said second wireless communication device occurs concurrently.

19. The system according to claim 11, wherein said threshold corresponds to physical contact between said first wireless communication device and said second wireless communication device.

20. The system according to claim 11, wherein:
said security information is information corresponds to a first level of security if said determined distance is above said first threshold and below a second threshold; and
said security information is information corresponds to a second level of security if said determined distance is above said first threshold and above said second threshold.

* * * * *